US 12,555,181 B2

United States Patent
Engh-Halstvedt et al.

(10) Patent No.: US 12,555,181 B2
(45) Date of Patent: Feb. 17, 2026

(54) GRAPHICS PROCESSING

(71) Applicant: Arm Limited, Cambridge (GB)

(72) Inventors: Andreas Due Engh-Halstvedt, Trondheim (NO); Frank Klaeboe Langtind, Melhus (NO)

(73) Assignee: Arm Limited, Cambridge (GB)

( * ) Notice: Subject to any disclaimer, the term of this patent is extended or adjusted under 35 U.S.C. 154(b) by 181 days.

(21) Appl. No.: 18/503,894

(22) Filed: Nov. 7, 2023

(65) Prior Publication Data

US 2024/0169474 A1 May 23, 2024

(30) Foreign Application Priority Data

Nov. 17, 2022 (GB) ..................................... 2217213

(51) Int. Cl.
*G06T 1/60* (2006.01)
*G06F 12/02* (2006.01)
*G06T 11/20* (2006.01)

(52) U.S. Cl.
CPC .............. *G06T 1/60* (2013.01); *G06F 12/023* (2013.01); *G06T 11/20* (2013.01)

(58) Field of Classification Search
CPC . G06T 1/60; G06T 11/20; G06T 11/40; G06F 12/023
See application file for complete search history.

(56) References Cited

U.S. PATENT DOCUMENTS

| | | | | |
|---|---|---|---|---|
| 6,433,789 B1 * | 8/2002 | Rosman | ................... | G06T 15/04 345/582 |
| 12,141,892 B1 * | 11/2024 | Thottappilly | ............. | G06T 1/20 |
| 2003/0122836 A1 * | 7/2003 | Doyle | ..................... | G06T 15/04 345/543 |
| 2005/0017970 A1 * | 1/2005 | Howson | ................ | G06T 15/405 345/421 |
| 2008/0186318 A1 * | 8/2008 | Redshaw | .................. | G06T 1/60 345/537 |
| 2011/0292032 A1 * | 12/2011 | Yang | ....................... | G06T 11/40 345/419 |
| 2013/0002663 A1 * | 1/2013 | Howson | .................. | G06T 15/10 345/419 |

(Continued)

FOREIGN PATENT DOCUMENTS

EP 1127337 B2 * 3/2014 ............. G06T 11/40

OTHER PUBLICATIONS

ACE Queue, Unbounded_Queue.cpp, (Rev. Mar. 4, 2008). (Year: 2008).*

(Continued)

*Primary Examiner* — Daniel F Hajnik
*Assistant Examiner* — Adeel Bashir
(74) *Attorney, Agent, or Firm* — Pearl Cohen Zedek Latzer Baratz LLP

(57) ABSTRACT

When preparing and storing a primitive list in a tile-based graphics processing system, a first block of memory space is allocated for storing the primitive list. When there is insufficient space in the first block of memory space to store all of the graphics primitives for the primitive list, a next block of memory space to be used for storing the primitive list is allocated for storing the primitive list. An indication of the location in memory of the allocated next block of memory space is written at the beginning of the first block of memory space.

18 Claims, 8 Drawing Sheets

(56) References Cited

U.S. PATENT DOCUMENTS

2016/0275920 A1\* 9/2016 Apodaca ................. G06T 15/40
2017/0262951 A1\* 9/2017 Smith .................... G06T 11/40
2021/0158598 A1\* 5/2021 Bratt .................... G06T 15/005

OTHER PUBLICATIONS

Kristof Beets, "PowerVR Tile-Based Rendering," Beyond3D, (Jan. 27, 2001). (Year: 2001).\*

Light Indexed Deferred Rendering, "Light Indexed Deferred Rendering," (Apr. 1, 2012). (Year: 2012).\*

\* cited by examiner

GRAPHICS PROCESSING

BACKGROUND

The technology described herein relates to graphics processing, and in particular to operating a tile-based graphics processing pipeline Graphics processing is normally carried out by first splitting a scene (e.g. a 3-D model) to be displayed into a number of similar basic components or "primitives", which primitives are then subjected to the desired graphics processing operations. The graphics "primitives" are usually in the form of simple polygons, such as triangles.

The primitives for an output such as a frame to be displayed are usually generated by the application program interface for the graphics processing system, using the graphics drawing instructions (requests) received from the application (e.g. game) that requires the graphics processing.

Each primitive is usually defined by and represented as a set of vertices, where each vertex typically has associated with it a set of "attributes", i.e. a set of data values for the vertex. These attributes will typically include position data and other, non-position data (varyings), e.g. defining colour, light, normal, texture coordinates, etc, for the vertex in question.

For a given output, e.g. frame to be displayed, to be generated by graphics processing, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and a set of primitives that use those vertices.

Once primitives and their vertices have been generated and defined, they can be processed in order to generate the desired graphics processing output (render output), such as a frame for display. This basically involves rendering the primitives (e.g. performing rasterising, ray tracing, or other suitable rendering processes) to generate the graphics processing output.

One form of graphics processing is a so called tile-based graphics processing, wherein the two-dimensional render output is rendered as a plurality of smaller area sub-regions, usually referred to as "tiles". The tiles are each rendered separately (typically one after another). The rendered tiles are then combined to provide the complete rendering output (e.g. frame for display).

Other terms that are commonly used for "tile-based" rendering include "chunking" (the rendering tiles are referred to as "chunks") and "bucket" rendering. The terms "tile" and "tile-based" rending will be used hereinafter for convenience, but it should be understood that these terms are intended to encompass all alternative and equivalent terms and techniques.

In a tile-based graphics processing system, it is accordingly usually desirable to be able to identify and know those primitives that are actually present in a given rendering tile so as to, e.g., avoid unnecessarily rendering primitives that are not actually present in a tile. Accordingly, in tile-based graphics processing, primitives to be processed for a given output (e.g. that make up the draw call currently being processed) are usually sorted into respective primitive lists that indicate for respective regions of the graphics processing output (render output), which primitives are to be processed for the region in question. The regions for which primitive lists are prepared in this regard may for example correspond to individual rendering tiles, or sets of plural rendering tiles. A given primitive may be included in more than one primitive list, e.g. where the primitive falls in more than one region.

Thus, in a tile based graphics processing system there will be an initial processing pass which, in effect, sorts the graphics primitives (and/or other graphics entities) to be processed into regions that the render output is divided into for processing purposes. This initial processing pass is performed for all the geometry (primitives), etc., for the render output unit of processing (e.g. draw call) to be processed. The rasterising and rendering of the geometry (primitives) in the tiles to generate the render output is then done once the initial processing to sort the geometry, etc. into the regions has been completed.

Tile based graphics processing pipelines can accordingly be thought of as (and referred to as) "deferred" graphics processing pipelines (graphics processors) (and to perform "deferred" rendering). This is because the rasterising and rendering pass is deferred until suitable lists of primitives to be processed have been prepared for the regions that the render output has been divided into for processing purposes.

When performing tile-based rendering there is a need to allocate memory for storing the primitive lists. The number of primitives required to render a given region of a graphics processing output, and therefore the number of primitives that are included in a primitive list for a region of the graphics processing output, may vary significantly between different regions of the graphics processing output, for example in dependence on the complexity of the geometry in the different regions of the graphics processing output.

One way to do this would simply be to allocate the maximum amount of memory space that could possibly be required for all of the primitive list data. However, this can be inefficient in terms of the overall usage of memory in the data processing system that the graphics processing pipeline is part of (or, indeed, there may not be sufficient available memory space to set aside for all of the (potentially) required data). It can also be a relatively complex to determine how much memory space should be allocated.

It would also be possible to use more complex analysis of the likely memory storage requirements so as to try to achieve more efficient allocation of memory for this purpose, but this can lead to increased driver complexity and operations (and/or may require some or all of the "memory allocation" operations to be performed on the graphics processor).

The Applicants believe that there remains scope for improvements to tile-based graphics processing.

BRIEF DESCRIPTION OF THE DRAWINGS

Various embodiments of the technology described herein will now be described by way of example only and with reference to the accompanying drawings, in which.

Like reference numerals are used for like elements in the Figures, where appropriate.

DETAILED DESCRIPTION

Figure 1:
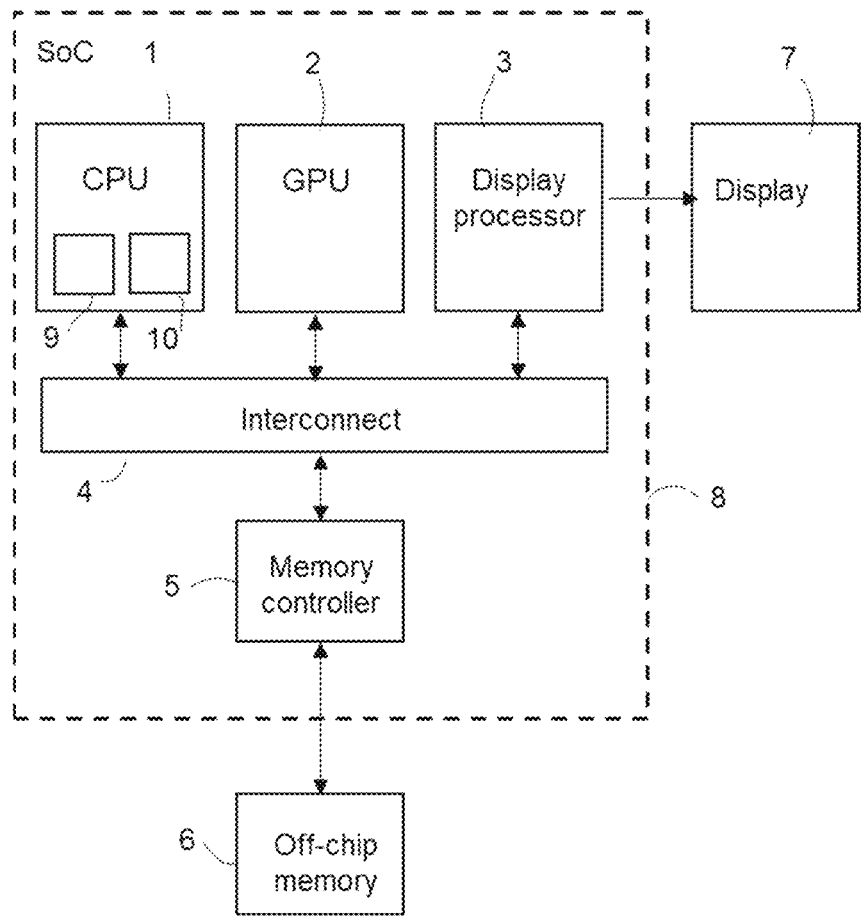
FIG. 1 shows a graphics processing system which can be operated in accordance with an embodiment of the technology described herein.

A first embodiment of the technology described herein comprises a method of operating a tile-based graphics processing system in which a graphics processing output to be generated is divided into a plurality of tiles for rendering purposes, with each tile of the graphics processing output being rendered separately, the method comprising:

preparing and storing a primitive list indicating graphics primitives to be processed for each of one or more regions of the graphics processing output;

wherein preparing and storing a primitive list comprises:
  allocating a first block of memory space for storing the primitive list;
  identifying graphics primitives to be included in the primitive list;
  writing graphics primitives to be included in the primitive list to the first block of memory space; and
  when there is insufficient space in the first block of memory space to write all of the graphics primitives to be included in the primitive list to the first block of memory space:
    allocating a next block of memory space to be used for storing the primitive list;
    writing an indication of the location in memory of the allocated next block of memory space at the beginning of the first block of memory space; and
    writing further graphics primitives for the primitive list to the allocated next block of memory space;

the method further comprising:
reading one or more primitive lists to identify graphics primitives to process for a tile of the graphics processing output to be rendered, wherein reading a primitive list comprises:
  reading an indication of the location in memory of an allocated next block of memory space used for storing the primitive list from the beginning of a block of memory space in which the primitive list is stored, and using the indication of the location in memory of the allocated next block of memory space to identify the allocated next block of memory space used for storing the primitive list;
  and
processing graphics primitives read from the primitive list to render the tile of the graphics processing output.

A second embodiment of the technology described herein comprises a tile-based graphics processing system comprising:

a graphics processor configured to render a graphics processing output to be generated, wherein the graphics processing output to be displayed is divided into a plurality of tiles for rendering purposes, with each tile of the graphics processing output being rendered separately;

a memory;

a tiling circuit configured to prepare and store in the memory, a primitive list comprising graphics primitives to be processed for each of one or more regions of a graphics processing output to be generated;

a memory block allocation circuit configured to allocate blocks of memory space for storing primitive lists; and a primitive list reading circuit configured to read primitive lists to identify graphics primitives to process for tiles of a graphics processing output to be rendered;

wherein the tiling circuit and memory block allocation circuit are configured to, when primitive lists are being prepared and stored in the memory:

allocate a first block of memory space in the memory for storing a primitive list;

identify graphics primitives to be included in the primitive list;

write graphics primitives to be included in the primitive list to the first block of memory space; and when there is insufficient space in the first block of memory space to write all of the graphics primitives to be included in the primitive list to the first block of memory space:
  allocate a next block of memory space to be used for storing the primitive list in the memory; and
  write an indication of the location in memory of the allocated next block of memory space at the beginning of the first block of memory space; and
write further graphics primitives for the primitive list to the allocated next block of memory space;

wherein the primitive list reading circuit is configured to, when identifying graphics primitives to process for a tile of the graphics output to be rendered:

read an indication of the location in memory of an allocated next block of memory space used for storing a primitive list from the beginning of a block of memory space in which the primitive list is stored, and use the indication of the location in memory of the allocated next block of memory space to identify the allocated next block of memory space used for storing the primitive list; and wherein the graphics processor is configured to process identified graphics primitives read from a primitive list when rendering a tile for a graphics processing output.

The technology described herein relates to the storage and use of primitive lists in a tile-based graphics processor and processing pipeline.

The Applicants have identified that when storing primitives in primitive lists it is beneficial to use a data structure where memory can be allocated as required as primitives are stored in primitive lists, and that in particular a suitable data structure for storing primitive lists is a so-called "linked list" data structure. In such a structure, the data (primitive list) is stored as a set of linked smaller blocks ("chunks") of memory space, rather than as one "big" block (chunk) of memory space.

Thus, in the technology described herein, when storing a primitive list, a first block of memory space for the primitive list is allocated in the memory, and graphics primitives to be stored for the primitive list are then added to the block of memory space until the block of memory space is full.

If there is insufficient space to store all the graphics primitives for the primitive list, a next block of memory space to be used for storing the primitive list is allocated, and an indication of the location in memory of the allocated next block of memory space used for storing the primitive list is written to the beginning of the first block of memory space.

In this way, primitive lists may be stored across a plurality of blocks of memory space, each block of memory space including an indication of the location in memory of a next block of memory space in which the primitive list is stored. This allows the necessary memory to be allocated for each primitive list without requiring complex processing.

Primitive lists are then read to identify graphics primitives to process for tiles of a graphics processing output to be rendered.

When reading a (and each) primitive list to identify graphics primitives to process for a tile of a graphics processing output to be rendered, an indication of a location in memory of a next block of memory space used for storing the primitive list is read from the beginning of a (current) block of memory space in which the primitive list is stored, such that the next block of memory space in which the primitive list is stored may be identified.

In this way, the primitive list may be read by reading data from a first block of memory space in which the primitive list is stored, reading an indication of a location in memory of a next block of memory space used for storing the primitive list, and then reading data from said next block of memory space. This may be repeated for any (and in an embodiment for each) block of memory space in which the primitive list is stored.

In the technology described herein, an indication of the location in memory of a next block of memory space used for storing the primitive list is provided at the start of a (and in an embodiment of each) block of memory space (used for the primitive list).

The Applicants have identified that providing the indication of the location in memory of the next block of memory space at the start of a block of memory space is beneficial when storing primitive lists when performing tile-based graphics processing.

In particular, primitive lists in tile-based graphics processing may contain large numbers of primitives, for example where the primitive list is for a region of a graphics processing output that contains complex geometry. Accordingly, a large amount of data may need to be fetched when reading such a primitive list. As such, it is beneficial to store primitives lists in blocks of memory space that are reasonably large, and so take time to fetch in their entirety.

By providing the reference to the next block of memory space at the start of a block of memory space, the graphics processor can identify the next block of memory space earlier, before all of the primitives in the current block of memory space have been fetched from memory. This may reduce latency when reading the primitive lists.

Furthermore, and as will be discussed in detail below, providing the reference to the next block of memory space at the start of a block of memory space may allow for greater flexibility in reading the primitive lists.

As noted above, the technology described herein relates to tile-based graphics processing, in which the render output (such as, e.g., a frame to be displayed) is divided into plural rendering tiles for rendering purposes (is processed on a tile-by-tile basis). Each rendering tile should, and in an embodiment does, span a (respective) sub-region (area) of the render output. The tiles that the render output is divided into for rendering purposes in the technology described herein can be any suitable and desired such tiles. The size and shape of the rendering tiles may be dictated by the tile configuration that the graphics processor is configured to use and handle.

The rendering tiles are in an embodiment all the same size and shape (i.e. regularly sized and shaped tiles are in an embodiment used), although this is not essential. The tiles are in an embodiment rectangular, and in an embodiment square. The size and number of tiles can be selected as desired. Each tile may correspond to an array of contiguous sampling positions, for example each tile being 16×16 or 32×32 or 64×64 sampling positions in size (wherein each sampling position may correspond to a pixel, or sub-pixel, for the render output). The render output may be divided into however many such tiles are required to span the render output, for the size and shape of the render output that is being used.

In the technology described herein, one or more, and in an embodiment plural, primitive lists are prepared and stored. Each primitive list identifies (lists) one or more primitives which are to be processed for a respective region (area) of the render output in question.

The regions for which primitive lists are prepared in an embodiment encompass (correspond to) one or more rendering tiles of the render output. For example, a primitive list region may correspond to a single rendering tile, or a set of plural rendering tiles. In an embodiment a region for which a primitive list is prepared corresponds to one or more contiguous tiles (and thus spans an array of contiguous sampling positions). A (and each) region for which a primitive list is prepared is in an embodiment rectangular (and more in an embodiment square).

In an embodiment, there are one or more sets of regions for which primitive lists can be prepared, with the regions in different sets of regions in an embodiment differing in size (area).

In an embodiment, the sets of regions are arranged in a hierarchy of sets of regions, wherein each set of regions corresponds to a layer in the hierarchy of sets of regions, and wherein regions in progressively higher layers of the hierarchy are progressively larger. Each set of regions (corresponding to a layer in the hierarchy) in an embodiment spans the (entire) render output, such that the render output is effectively overlaid by plural layers of sets of regions (and accordingly wherein regions in different layers in the hierarchy may overlap one another).

In an embodiment, each region for which a primitive list can be prepared in a lowest layer of the hierarchy corresponds to a single tile of the render output, with regions in successively higher layers encompassing progressively more tiles, e.g. corresponding to 2×2 tiles, 4×4 tiles, 8×8 tiles, etc. respectively (or any other suitable and desired increasing region size). Thus, the sets of regions in an embodiment comprise one set of regions in which each region of the set corresponds to a respective single rendering tile, and one or more (and in an embodiment more than one) sets of regions in which each region of the set corresponds to (encompasses) more than one rendering tile.

In an embodiment regions in the same set of regions (same layer of the hierarchy) are the same size and shape (for example, each encompassing the same number of tiles). In an embodiment regions in the same set of regions (same layer of the hierarchy) correspond to different regions of the render output (such that regions in the same set of regions do not overlap).

It will be apparent that, in such arrangements, regions in different sets of regions (different layers of the hierarchy)

may encompass the same portion of a render output (albeit at a different resolution), such that a primitive may fall within one or more regions in different layers of the hierarchy (and correspondingly have one or more primitive lists into which it could be included). (Likewise, primitive lists for multiple different regions in different layers of the hierarchy may need to be consulted in order to identify primitives needed to render a tile).

The set of primitives which are to be processed for the render output (and for which primitive lists are to be prepared) may comprise a set of primitives for generating the entire (complete) render output, or in an embodiment are a set of primitives for generating part of the render output (e.g. corresponding to a draw call).

In order to prepare the primitive lists, the primitives of the set of primitives may first be assembled, and then the positions of the assembled primitives may be used to determine which region(s) of the render output the primitive falls within (and thus which primitive list(s) to include the primitive in).

Assembling the set of primitives may be performed by a suitable primitive assembly circuit. Assembling the set of primitives may be performed in any suitable and desired manner. For example, primitive assembly may comprise receiving information (e.g. indices) identifying vertices of a set of vertices to be used to form the primitives of the set of primitives, and then assembling primitives (determining the vertices corresponding to each primitive of the set of primitives) using the information (e.g. indices) identifying the vertices. The primitive assembly may be performed in accordance with information (primitive configuration information) indicating how the primitives are to be assembled, e.g. indicating whether primitives in the form of simple triangles, triangle strips, or triangle fans, etc., should be generated from the set of vertices.

To prepare the primitive lists (to identify primitives to be included in a (and the respective) primitive list, the (assembled) primitives are sorted (binned) into one or more primitive lists based on the region(s) of the render output which the primitives at least partially fall within.

Which region(s) a primitive (at least in part) falls within (and accordingly which primitive lists a primitive could be included in) will be, and is in an embodiment, determined based on the position of the primitive in the render output. The position of the primitive in the render output may be, and is in an embodiment, determined based on the positions of the vertices of the primitive.

The positions of the vertices of the primitives that are used for the primitive listing process should, and in an embodiment do, comprise the positions of the vertices in the "screen space" of the render output.

Thus, in an embodiment, appropriate position shading for the vertices of the primitives is performed to transform (shade) the positions (position attributes) of the vertices as appropriate for the render output. The so transformed (shaded) positions are in an embodiment then used for preparing the primitive lists.

The position shading may be performed, e.g. before or after primitive assembly.

Hence, in embodiments, prior to sorting primitives of the set of primitives to be processed for the render output into primitive lists, processing of one or more position attributes (position shading) is performed for vertices of a set of vertices to be used to form the set of primitives. Correspondingly, when preparing primitive lists, the region(s) which a primitive falls within (and accordingly which primitive lists the primitive could be listed in) is determined based on vertex shaded positions of the vertices of the primitive.

The determination of which region(s) a primitive falls within may make use any suitable and desired technique, such as exact binning, or bounding box binning, or a combination of these techniques. In an embodiment bounding box binning is used when preparing primitive lists.

As noted above, in embodiments, primitive lists may be generated for regions of the render output which comprise plural sets of regions arranged as a hierarchy of sets of regions (such that the render output is effectively overlaid by plural layers of sets of primitive list regions). In this case, a given primitive could, for example, be equally listed in primitive lists at different layers (levels) of the hierarchy. In an embodiment therefore, it is determined which layer of the hierarchy to list a primitive at.

In this case, when determining which primitive list(s) (at which level of the hierarchy) to include a primitive in, there may be a balance to be struck between the number of lists a primitive is written in to, and the size of the regions of the render output it is listed for (as this will determine the number of times the primitive will need to be read, potentially unnecessarily, during subsequent per-tile processing, e.g. such as rendering and rasterising).

For example, if a primitive is listed at a lower level of the hierarchy (for smaller render output regions), it will have to be written into a larger number of primitive lists, but if it is written at a higher level of the hierarchy (for larger render output regions), it will potentially be re-read and processed more times as the list for the region will be reused for each rendering tile the region covers during subsequent per-tile processing. In embodiments, a cost function that considers read, processing and write costs may be used to determine at which level of the hierarchy a primitive should be listed, e.g. to try to optimise this balance.

Hence, in embodiments, a cost function is used to determine a particular layer of the hierarchy of sets of regions at which a primitive should be listed. The cost function may account for (be based on) a cost of reading a primitive from a primitive list and/or writing a primitive to a primitive list for one or more different layers of the hierarchy, and/or the cost of processing a primitive for a tile.

Including (listing) a primitive in a primitive list (bin) may, and in an embodiment does, comprise listing appropriate data for the primitive in the primitive list, such as an identifier (e.g. an index) for the primitive, together with an indication of the vertices of the primitive (e.g. such as an index identifying each vertex of the primitive). In an embodiment the primitive lists comprise an appropriate sequence of commands, inter alia, identifying primitives to be processed for the render output region that the primitive list relates to.

There may be some (assembled) primitives of the set of primitives for the render output which are not listed in any primitive list, e.g. if those primitives fall outside the view frustrum or are otherwise culled (e.g. based on a facing direction culling test).

The primitive lists which are prepared may be stored in a suitable storage (e.g. memory, e.g. a local memory or in an embodiment a main memory of the graphics processing system which the graphics processor is part of), for use during later processing (e.g. such as, e.g. including one or more of rasterising, rendering, ray tracing, and any other suitable rendering processing).

In the technology described herein, rather than for example storing a primitive list or lists in a single pool (heap) of contiguous memory addresses from which memory can be allocated to store the primitive lists, the primitive lists are stored in one or more blocks of memory space.

Thus, rather than having to set aside a large set of contiguous memory addresses for storing a (and each) primitive list for a graphics output (e.g. frame for display), plural smaller blocks of contiguous memory addresses that are, e.g., spread around in memory can be, and are, provided and used to provide the memory space for storing primitive lists for a graphics output (e.g. frame for display).

This can facilitate simpler and more flexible memory management. For example, by adding or removing blocks of memory space to or from the set of blocks of memory space for the primitive lists, the size of the memory space for storing a (and each) primitive list can be increased or decreased in a straightforward manner. This can improve the handling of "out-of-memory" situations, and moreover, can allow the size of the overall pool (heap) of memory space to be adjusted in response to the actual amount of memory space that is being used for a region of a graphics output (e.g. frame for display). Thus, the memory footprint for storing primitive lists can be better tailored to the actual requirements of the graphics processing being performed.

Memory space blocks can be allocated for primitive lists (by the memory space block allocation circuit) in any suitable and desired manner, for example in the normal manner for memory space allocation requests in the graphics processing system in question. In an embodiment, memory space blocks are allocated in response to a suitable request for a memory space block to be allocated.

Correspondingly, the memory space block allocation circuit is in an embodiment an appropriate hardware unit of the graphics processing system. The memory space block allocation circuit may be external to the graphics processor, but is in an embodiment local to (part of) the graphics processor.

A (each) block of memory space can comprise any memory space suitable for storing (at least) graphics primitives. The memory space is in an embodiment memory space in a (main) memory of the graphics processing system. Thus, there is in an embodiment an allocated set of plural blocks of memory space that together form a memory space pool (a "heap") in the memory of the graphics processing system that is set aside for use by the graphics processing pipeline for storing the primitive lists.

A (each) block of memory space (a "chunk") should, and in an embodiment does, comprise a set of contiguous (virtual) memory addresses (in the virtual (logical) memory address space), that should, and in an embodiment does, start from (i.e. have) a lowest (bottom) memory address and extend to a highest (top) memory address. Thus, a (each) block of memory space should, and in an embodiment does, comprise a set of contiguous virtual memory addresses. The virtual memory addresses for a block of memory space block will be, and are in an embodiment, associated with a corresponding set of physical memory addresses, which set of (physical) memory addresses are also in an embodiment contiguous, but need not be contiguous, memory addresses (in the physical memory address space). Thus, a (the) set of blocks of memory space in an embodiment comprises plural blocks of memory space, each block of memory space comprising a contiguous set of memory addresses.

In embodiments, the memory space is divided into blocks in advance of preparing the primitive lists. In such embodiments, allocating a (and each) block of memory space for storing a (and each) primitive list comprises dividing the memory space into a plurality of blocks (chunks) and, when preparing the primitive lists, allocating these (pre-divided) blocks for use in storing a (and each) primitive list as required. In other words, a (the) set of blocks of memory space may be defined, and then blocks from the set may be allocated for storing a (and each) primitive list as necessary.

In other embodiments, blocks of memory space may be allocated from the memory space as required when preparing primitive lists. In such embodiments, allocating a (and each) block of memory space for storing a (and each) primitive list comprises allocating a set of memory addresses to form the block of memory space, and then allocating said block for storing the primitive list. In such embodiments, a set of blocks of memory space may therefore be defined for storing a (and each) primitive list as necessary.

The blocks of memory space may be allocated in any other suitable way as desired.

A (each) block of memory space should be independent of each other block of memory space, and thus should comprise an independent section of memory space. Thus, different blocks of memory space can be distributed in the memory address space as suitable and desired.

In an embodiment, there is at least one memory space block which is not contiguous with any other block of memory space, i.e. there is at least one block of memory space whose lowest memory address is not preceded by, and whose highest memory address is not followed by, a memory address of another memory space block. All of the blocks of memory space could be non-contiguous blocks of memory space, or there may be a combination of contiguous and non-contiguous blocks of memory space, as desired. Thus, two or more blocks of memory space may be contiguous with each other, i.e. the lowest memory address of a memory space block may be the memory address following the highest memory address of another block of memory space.

A (and each) allocated memory space block can be any suitable and desired size (i.e. can comprise any suitable and desired number of memory addresses). In one embodiment, each allocated block of memory space is the same, particular, and in an embodiment selected, and in an embodiment predefined, (fixed) size (encompassing the same range of memory addresses) as each other block of memory space that is allocated. For example, each block of memory space may be 512 B in size. In another embodiment, as will be discussed below, blocks of memory space having different sizes may be used for a primitive list (and the primitive lists).

Where a block of memory space comprises the same or larger amount of memory space than is needed to store a given primitive list, then that primitive list may be stored in a single block of memory space. Where, however, a block of memory space is smaller than is needed to store a primitive list, then the primitive list can be, and will be, stored in multiple different blocks of memory space.

In the latter case, the set (sequence) of plural blocks of memory space for a primitive list can be provided in any suitable and desired (memory address) order. The blocks of memory space could follow a "memory address order", e.g. such that the memory addresses of a (each) block of memory space are (all) higher than (or lower than) the memory addresses of any preceding blocks of memory space in the sequence, or the sequence could jump from block to block in an order which does not correspond to "memory address order".

In the technology described herein, in order to identify the next block in the sequence of blocks being used for a primitive list, an indication of the location in memory of the allocated next block of memory space is included in (at the beginning of) the block of memory space that precedes that next block of memory space. Thus, in an embodiment, an indication indicating the memory location of another (the next) block of memory space in which the primitive list is stored is included in a (and in an embodiment each) block of memory space used for storing a primitive list (that is not the last block of memory space used for storing the primitive list).

An indication of the location in memory space of an allocated next block of memory space can be provided as desired. In an embodiment, the indication of the location in memory space of an allocated next block comprises a pointer which in an embodiment points to a (e.g., and in an embodiment, the lowest or highest) memory address for the next memory space block, to indicate the next block of memory space in the sequence of memory space blocks for the primitive list in question.

When a block of memory space is the final (end) block of memory space for a primitive list (i.e. the last of a sequence of plural blocks of memory space for a primitive list, or the only block of memory space in which a primitive list is stored), an indication that no further blocks of memory space have been used to store the primitive list may be, and in an embodiment is, stored at the start of that (last) block of memory space (in an embodiment in place of any indication of a next block of memory space for the list). This will be discussed in more detail below.

When a block of memory space is the final (last or only) block of memory space used for a primitive list, the indication that no further blocks of memory space have been used to store the primitive list in an embodiment comprises a pointer to a memory address but which does not point to another block of memory space (e.g. may be a "null" or a dummy value), to indicate that the associated block of memory space is the final block of memory space for the primitive list in question.

In the technology described herein, the indication of the location in memory space of the allocated next block for a primitive list is located (stored) at the beginning of a block of memory space. For example, and in an embodiment, it may be stored as the first entry, e.g. "data word", in the block of memory space (and will be followed by primitive list "content", e.g. commands, in the block of memory space). In this way, the indication of the location in memory space of the allocated next block can be read before reading (and in an embodiment without reading) any of the "content" (e.g., and in an embodiment, graphics primitives) for the primitive list stored in the block of memory space. This enables the memory address of the next memory space block in a sequence of blocks of memory space for a primitive list to be identified before all of the content, e.g. graphics primitives (e.g. commands), for the primitive list in the current block of memory space have been read.

The Applicants have recognised in this regard that, particularly for relatively large blocks of memory space, it can take a relatively long time to read all of the primitive list (e.g. graphics primitives) from a (full) memory space block. As such, providing an indication of the location in memory space of the allocated next block at the start of a (current) block of memory space may allow latency to be reduced when fetching graphics primitives from a sequence of memory space blocks storing a primitive list.

In the technology described herein, when there is insufficient space in a (current) block of memory space to write all of the graphics primitives to be included in a primitive list to that (current) block of memory space, a next block of memory space is allocated for storing the primitive list.

Determining whether a (the current) memory space block has sufficient memory space available to store the primitive list can be performed as desired, for example in accordance with the memory overflow mechanisms that are otherwise used in the graphics processing system that the graphics processor is part of.

It can be determined that there is insufficient space in a (first) block of memory space to write all of the graphics primitives for a primitive list in any suitable and desired way. For example, and in an embodiment, it could be determined that the (first) block of memory space is full or is more than a certain amount full (that all or more than a threshold amount of the block has been used for the primitive list). Alternatively, or additionally, it could be determined that the amount of data required to store a next number of graphics primitives, for example one, two, or more, primitives, to be stored for the primitive list is larger than the amount of memory space remaining in the (first) block of memory space.

Once a new block of memory space has been allocated for a primitive list, an indication of a location in memory space of that allocated next (second) block is written at the beginning of the current (first) block of memory space. Further graphics primitives for the primitive list are then written to the allocated next (second) block of memory space.

This process can be (and in an embodiment is) repeated for each subsequent block of memory space required to store a primitive list, until the entirety of the primitive list has been stored in one or more memory space blocks.

Writing of a primitive list to a (each) block of memory space can proceed in any desired manner. In an embodiment, (commands for) primitives for the primitive list are written to consecutive memory addresses of the block of memory space in order (to consecutive data words of the memory space block).

To ensure that a memory location reference (e.g. pointer) can be subsequently (safely) written at the start of the block of memory space, suitable space should be, and is in an embodiment, left available for the memory location reference at the beginning of the memory block (i.e. any content of the primitive list (e.g. a primitive for the primitive list) should not be, and in an embodiment is not, written to the memory addresses required for the memory location reference at the beginning of a memory space block).

This can be achieved in any suitable and desired manner. For example, and in an embodiment, when a block of memory space is allocated for storing a primitive list, a "placeholder", dummy value (e.g. a null value) is (first) written to the head of the block of memory space (to the first data word of the block of memory space). Primitives are in an embodiment then written into the remainder of the block of memory space. When the block of memory space is full, and a next block of memory space has been allocated for storing the primitive list, the placeholder value (e.g. null value) at the head of the block of memory space can then, be, and is in an embodiment, replaced with the indication of the location in memory of the allocated next block of memory space.

Accordingly, in an embodiment, allocating a block of memory space for storing a primitive list comprises writing a dummy value to the beginning of the block of memory space, and writing the indication of the location in memory of the allocated next block of memory space at the beginning of the block of memory space comprises replacing the dummy value with the indication of the location in memory of the allocated next block of memory space.

In another embodiment, rather than explicitly writing a dummy value to the start of the block of memory space, the writing of the content for the primitive list (e.g. graphics primitives) is started from a location other than (after) the beginning of the block of memory space, such that space is left at the beginning (head) of the block of memory space for the writing of an indication of the location in memory of the allocated next block of memory space.

In this case therefore, the content of the primitive list (further graphics primitives) will be written to the remainder of the block of memory space after leaving a gap at the beginning (head) of the block of memory space, and when a next block of memory space has been allocated for storing the primitive list, the indication of the location in memory of the allocated next block of memory space will be written into the space (gap) at the beginning (head) of the block of memory space (before the content of the primitive list).

Accordingly, in an embodiment, the method comprises (and the graphics processor is correspondingly configured to) writing the content for a primitive list starting at a location after the beginning of an allocated block of memory space, so as to leave unused memory space at the beginning of the block of memory space, and writing the indication of the location in memory of the allocated next block of memory space at the beginning of the block of memory space comprises writing the indication of the location in memory of the allocated next block of memory space in the space at the beginning of the block of memory space that was not (that was other than) written with content for the primitive list.

In an embodiment, the location of the start and end of (of the head and tail of) a (and of each) primitive list is tracked whilst writing and storing the primitive list(s).

In an embodiment, when a primitive list is first started, the location (in memory) of the start of the primitive list (of the head of the primitive list) is in an embodiment recorded, so that the start (head) of that primitive list in memory can subsequently be identified (e.g. when it is desired to read the primitive list). This start "location" may, and in an embodiment does, comprise an indication of the location of the first memory space block used for the primitive list.

Such primitive list start (head) information can be stored in any suitable and desired manner. For example, and in an embodiment, an array of primitive list start addresses, e.g. and in an embodiment, containing an appropriate head pointer for each primitive list that has been generated pointing to the start of the primitive list, may be stored.

Correspondingly, in an embodiment, a record is maintained of the position of the end of the primitive list, i.e. of the last location (address) in the memory that was written for the primitive list, as a primitive list is being written (such that the next location in which to write content (an entry) for the primitive list can be identified when writing the primitive list).

At least while the primitive lists are being written and stored to memory, this record of the current ends (tails) of the primitive lists is again in an embodiment maintained as an appropriate array of primitive list end indications (tail pointers), pointing to the most recent address used to store a primitive list (and therefore the current "end" of the primitive list as stored in the memory).

These list "end" indications (tail pointers) for the primitive lists are in an embodiment then used to identify where a next entry in a primitive list should be written, when generating the primitive list.

Correspondingly, when new content, such as a new primitive, is written to a primitive list, the corresponding indication of the current end of the primitive list (the tail pointer) is in an embodiment updated to indicate the (new) end (tail) of the primitive list.

In this case, the primitive list end (tail) indications may be a memory address within a memory space block allocated for storing the primitive list.

Such a primitive list end (tail) pointer array, for use when writing the primitive lists, may be provided separately to a primitive list head pointer array, for example, or there may, for example, be a single array that stores both the head pointers and tail pointers for the primitive lists as they are being written.

As well as using at least the record of the current end positions (tails) of the primitive lists when writing the primitive lists, in an embodiment, the locations (in memory) of the starts and ends of the primitive lists (of the heads and tails of the primitive lists) is also provided to and used when and for reading the primitive lists, so as to, for example, and an embodiment, allow the beginning of a given primitive list to be identified when it is desired to read that primitive list, and, correspondingly, the end of the primitive list to be identified when reading a primitive list.

In an embodiment, the locations of the starts of (the head pointers for) each of the primitive lists are provided to the primitive list reader (reading process) as a respective array of, e.g. the head pointers for each of the primitive lists, which can then be read to determine the start of a primitive list to be read.

The locations of the ends (the tails) of each primitive list could also be made available and provided to the primitive list reading process, e.g. so that the primitive list reading process can identify and determine when a primitive list has been read in its entirety, by providing an appropriate array of primitive list end (tail) information (e.g. pointers) to and for the primitive list reading process (and in an embodiment, that is what is done).

However, in an embodiment, rather than providing a separate set (e.g. array) of primitive list end (tail) indications (pointers) for use by the primitive list reading process, the information indicating the ends (tails) of the primitive lists is stored with the primitive lists themselves (i.e. is provided within the set of one or more memory space blocks that contain a primitive list (rather than being provided in a separate, e.g., array, of primitive list tail pointers)).

Thus, in an embodiment, the set of one or more memory space blocks storing a primitive list also store an indication of the end of (of the tail of) (a tail pointer for) the primitive list in question.

This can be achieved in any suitable and desired manner. In an embodiment, the indication of the end of (the tail pointer for) a primitive list is stored in the final block of memory space that is used for storing the primitive list (i.e. in the last block of memory space used for storing the primitive list where there is a sequence of plural blocks of memory space being used for storing the primitive list, or in the only block of memory space being used to store the primitive list where only a single block of memory space is being used to store the primitive list).

In an embodiment the primitive list end indication (tail pointer) is stored at the beginning of the final block of memory space storing the primitive list, and in an embodiment is stored at the beginning of the final block of memory space for the primitive list instead of (and in place of) an indication of the memory address for a next allocated block of memory space for the primitive list.

Thus, in an embodiment, the method of the technology described herein comprises (and the tiling circuit is correspondingly configured to), for a final block of memory space allocated to be used for storing a primitive list, writing an indication of the location in memory of the end of the primitive list at the beginning of that (final) block of memory space allocated for storing the primitive list (rather than writing an indication of the location in memory of an allocated next block of memory space at the beginning of the block of memory space).

Thus, where a dummy, place holder value is written at the start of a block of memory space for a primitive list, that dummy, place holder value, in the final block of memory space for a primitive list, will be replaced with an appropriate indication of (a tail pointer for) the end of the primitive list. Similarly, where a "gap" of unused memory space is left at the beginning of a memory space block for the purposes of including a next memory space block indication in the memory space block, for the final memory space block for a primitive list, the indication of the end of the primitive list (e.g. tail pointer) will be written into that "gap" at the beginning of the final memory space block for the primitive list in question.

In an embodiment, the end of primitive list indications (tail pointers) are written into the final memory space blocks used for a (and for each) primitive list as part of a "finalise" process, that is performed once all of the primitive lists have been generated.

In an embodiment, a separate record, e.g. array, of the ends of the primitive lists being generated is maintained as the primitive lists are generated (as discussed above), but then once all the primitive lists have been generated, the primitive list end information in the array is written from the array to the final memory space blocks of the primitive lists (as discussed above), e.g., and in an embodiment, as part of a "finalise" process for the preparation of the primitive lists, with the array of primitive list end information (tail pointers) then being discarded (once the information from the array has been appropriately transferred to the primitive lists themselves). (However, an array of primitive list start information (head pointers) is in an embodiment retained and made available to (provided to) the primitive list reading process.)

Storing the tail pointers for the primitive lists in the final blocks of memory space containing the primitive lists reduces the amount of data that must be fetched, read and maintained (separately to the primitive lists themselves) when reading (using) the primitive lists.

In an embodiment, as well as including at the beginning of each memory space block used for a primitive list, an appropriate indication (pointer) to the next memory space block in the sequence of memory space blocks being used to store the primitive list, or an indication (pointer) that indicates that a memory space block is the final memory space block used for a primitive list, further information relating to the memory space blocks, e.g., and in an embodiment, that can assist the reading of the memory space blocks storing a primitive list, is included at the beginning of a (and in an embodiment of each) memory space block.

This further information may be any suitable and desired information that may, for example, and in an embodiment, be used and useful when reading the memory space blocks. For example, in an embodiment, each memory space block also stores at the beginning of the memory space block (e.g., and in an embodiment, in association with an indication (pointer) to a next memory space block (or a null or tail pointer, as appropriate)), an indication of whether the next memory space block used for the primitive list is "full" or not.

For example, and in an embodiment, each memory space block could have a "next memory space block full" flag at its beginning, that can be set to indicate whether the next memory space block that is indicated is full or not. This can then be, and is in an embodiment, used when reading the primitive lists to identify whether all or only some of a next memory space block storing a primitive list should be read (and to accordingly either immediately trigger the reading of all of a next memory space block, or only part of a next memory space block).

It would also be possible, rather than simply using a "full/not full" flag, to provide an indication of the actual amount of data that is stored in the next memory space block, for example at a granularity corresponding to the size of individual memory transactions, such as at a cache line granularity, for and in the graphics processing system in question. This may be particularly useful where the next memory space block is the last memory space block (and so may therefore not be full) for the primitive list in question.

This additional information can be included in the memory space blocks in any suitable and desired manner. In an embodiment, it is included as part of, and by performing, a "finalise" process over and for the primitive lists, which finalise process, e.g., and in an embodiment, and as discussed above, in an embodiment also updates the next memory space block indications for the final memory space blocks used for each primitive list with a (tail) pointer to the end of the primitive list within the blocks in question.

In an embodiment the size of the next memory space block is indicated and provided in the preceding (current) memory space block, in an embodiment together with the pointer to the next block that is stored at the beginning of the block. This may be particularly useful where the memory space blocks used for storing a primitive list can differ in size. Thus in an embodiment, each memory space block also includes an indication of the size of the next memory space block at its beginning, in an embodiment in association with the pointer to the next block. The size indication can then be, and is in an embodiment, used when reading the primitive list to determine the size of a next memory space block storing a primitive list (and accordingly, e.g., how much data should be read for that memory space block).

In an embodiment, when a next memory space block is allocated for storing a primitive list, the size of that allocated memory space block is also selected (determined), and the pointer and the (selected) block size are then written to the beginning of the current (just finished) block. Thus the technology described herein in an embodiment comprises, when there is insufficient space in a (first) block of memory space to write all of the graphics primitives to be included in a primitive list to the (first) block of memory space: allocating a next block of memory space to be used for storing the primitive list, including selecting the size of the next block of memory space to be used for storing the primitive list; and writing an indication of the location in memory of and of the size of the allocated next block of memory space at the beginning of the (first) block of memory space.

The technology described herein also extends to the preparing and storing the primitive lists.

Thus, an embodiment of the technology described herein comprises a method of preparing and storing primitive lists for use in a tile-based graphics processing system in which a graphics processing output to be generated is divided into a plurality of tiles for rendering purposes, with each tile of the graphics processing output being rendered separately, the method comprising:

preparing and storing a primitive list indicating graphics primitives to be processed for each of one or more regions of the graphics processing output;

wherein preparing and storing a primitive list comprises:
allocating a first block of memory space for storing the primitive list;
identifying graphics primitives to be included in the primitive list;
writing graphics primitives to be included in the primitive list to the first block of memory space; and
when there is insufficient space in the first block of memory space to write all of the graphics primitives to be included in the primitive list to the first block of memory space:
allocating a next block of memory space to be used for storing the primitive list;
writing an indication of the location in memory of the allocated next block of memory space at the beginning of the first block of memory space; and
writing further graphics primitives for the primitive list to the allocated next block of memory space.

Another embodiment of the technology described herein comprises a graphics processor configured to perform tile-based graphics processing in which a graphics processing output to be generated is divided into a plurality of tiles for rendering purposes, with each tile of the graphics processing output being rendered separately, the graphics processor comprising:

a primitive list preparation circuit configured to prepare and store in memory, a primitive list comprising graphics primitives to be processed for each of one or more regions of a graphics processing output to be generated; and
a memory block allocation circuit configured to allocate blocks of memory space for storing primitive lists;
wherein the primitive list preparation circuit and memory block allocation circuit are configured to, when primitive lists are being prepared and stored in the memory:
allocate a first block of memory space in the memory for storing a primitive list;
identify graphics primitives to be included in the primitive list;
write graphics primitives to be included in the primitive list to the first block of memory space; and
when there is insufficient space in the first block of memory space to write all of the graphics primitives to be included in the primitive list to the first block of memory space:
allocate a next block of memory space to be used for storing the primitive list in memory; and
write an indication of the location in memory of the allocated next block of memory space at the beginning of the first block of memory space; and
write further graphics primitives for the primitive list to the allocated next block of memory space.

As will be appreciated by those skilled in the art, these embodiments of the technology described herein may, and in an embodiment do, comprise any one or more or all of optional features of the technology described herein, as appropriate.

After the primitive lists have been prepared, the primitive lists may be, and are in an embodiment, used for subsequent processing (of the primitives in the primitive lists). The subsequent processing may comprise, for example, and in an embodiment rendering one or more tiles of the render output, using the primitive lists to identify primitives to be processed for a given tile.

The subsequent processing may be, and is in an embodiment, performed on a tile-by-tile basis (with each tile corresponding to a respective sub-region of the render output being processed separately (e.g. in turn)). The processing performed on a tile-by-tile basis may comprise any suitable and desired processing for rendering a tile of a render output, e.g. triangle setup, rasterising, depth culling, rendering (e.g. fragment shading and/or ray-tracing), etc.

The subsequent processing for a (and each) tile in an embodiment comprises identifying a primitive list or lists relevant to the tile to be processed (the relevant primitive list(s) each corresponding to a region of the render output which includes (some or all of) the tile), and using the identified primitive list(s) when processing the tile. This (in an embodiment) comprises reading the identified primitive lists to identify primitives to be processed for the tile from the primitive list(s), e.g. by a primitive list reader (primitive list reading circuit), and then processing the identified primitives.

In an embodiment, reading a (and each) primitive list comprises identifying the location of the start of the primitive list in memory, e.g., and in an embodiment, by reading a stored array of primitive list start indications (e.g. header pointers). The primitive list may be, and is in an embodiment, then read starting from the indicated start memory address.

As described above, a (and each) primitive list is stored in one or more blocks of memory space. At the start of each block of memory space (except for the final block for a list) is an indication of a next block of memory space in which the primitive list is stored. At the start of the final block of memory space for a primitive list (i.e. the last block of memory space in a sequence of plural blocks of memory space for a primitive list, or the only block of memory space for a primitive list) there will instead be, in an embodiment, a "null" indication or an indication (a pointer) to the end of the primitive list (which is a location within the memory space block in question).

Accordingly, reading a (and each) primitive list in an embodiment comprises reading a (and each) block of memory space that is storing the primitive list in turn, following the sequence of memory space blocks for the primitive list, until the end of the primitive list is reached.

When reading a primitive list, in an embodiment the current position in the primitive list that has been reached is tracked, so as to allow the next position to be read for the primitive list to be identified. Thus, when first reading a primitive list, the current read position for the primitive list is in an embodiment set to the start of the primitive list. Correspondingly, the current read position for a primitive list is in an embodiment updated to the start of the next block of memory space to be read for a primitive list, when the end of a current block of memory space being read for the primitive list is reached. Thus, when the end of a current block of memory space being read for a primitive list is reached, the current read position indication (pointer) indicating the next memory location to be read for the primitive list will be, and is in an embodiment, updated to correspond to the memory location indicated at the beginning of the current block of memory space for the next block of memory space that is storing the primitive list.

It can be determined that the end of a current block of memory space being read for a primitive list has been reached in any suitable and desired manner. In an embodiment this is done using the tracked current read position for the primitive list, by identifying when the current read position for the primitive list has reached the end of the current block of memory space for the primitive list (such that then the current read position indicating the next memory location to be read for the primitive list should be updated to the beginning of the next block of memory space that is storing the primitive list).

The position corresponding to the end of a block of memory space storing a primitive list can be determined in any suitable and desired manner. For example, where the memory space blocks are all a particular, in an embodiment selected, in an embodiment predetermined, size, that known size of the memory space blocks can be used to determine when the end of a memory space block has been reached. Additionally or alternatively, it would, be possible, for example, to provide an indication of the size of a memory space block and/or of the position of the end of a memory space block in use. As discussed, this may in an embodiment be provided with the pointer to the next block at the beginning of a block, and/or, e.g., as part of a header and/or descriptor for a block of memory space.

The tracked current read position for a primitive list that is being read is in an embodiment also used to determine when the end of the primitive list has been reached. This is in an embodiment achieved by comparing the current read position for the primitive list to a known end position for the primitive list (which as discussed above, will in an embodiment be provided to the primitive list reading process, e.g., and in an embodiment, in an array of tail pointers for the primitive lists, or by including the tail pointer for a primitive list in the final block that is used for storing a primitive list). When the current read pointer points to the position of the tail of the primitive list, it can then be determined that the end of the primitive list has been reached.

Thus, in an embodiment, reading a primitive list will comprise reading each block of memory space that the primitive list is stored in, following the indications of the next allocated blocks of memory space in order to identify the appropriate next block of memory space from which the primitive list should be read, until the end of the primitive list is reached (as in an embodiment determined from an appropriate end indication (tail pointer) for the primitive list).

Thus when reading a block of memory space storing a primitive list, the block of memory space will be read from its beginning, and the appropriate indication of the location in memory of the allocated next block of memory space used for storing the primitive list, or a null indication or tail pointer, will first be read from the beginning of the block of memory space, and then (in an embodiment) either used to locate the next block of memory space for the list or to determine that the final block of memory space for the list has been reached (and so on, as appropriate).

This should be, and is in an embodiment, repeated for each block of memory space in which a primitive list is stored. As such, where a primitive list is stored in plural blocks of memory space, reading the primitive list in an embodiment comprises following a series of indications of next allocated blocks of memory space to determine a sequence of next blocks of memory space in which the primitive list is stored, and reading further graphics primitives from each of the next blocks of memory space in which the primitive list is stored.

As discussed above, when reading a stored primitive list, the primitive list should be, and is in an embodiment, read from the respective block(s) of memory space allocated for storing the primitive list, with the blocks of memory space being read in turn, following the "links" between the blocks of memory space for a primitive list.

In an embodiment, the primitive lists are fetched from where they are stored in main memory (as respective sequences of one or more memory blocks) into an appropriate local (intermediate) storage for use, such as an appropriate cache or buffer (a "read buffer") for storing the primitive lists, with the primitive lists then being read (and processed) from that local storage (e.g. cache) to identify primitives to be processed for a given rendering tile.

The respective memory space blocks storing a primitive list may be fetched from memory into the local, intermediate storage for use in any suitable and desired manner.

For example, it would be possible in this regard simply to fetch the entirety of a block of memory space storing a primitive list when the block of memory space falls to be read (and in an embodiment, this is what is done).

However, in an embodiment, the method of the technology described herein comprises (and the primitive list reading circuit is correspondingly configured to), at least when fetching the first block of memory space to be read for a primitive list (i.e. when starting to fetch the first block of memory space to be read for a primitive list), initially fetching only a portion (i.e. some but not all) of the block of memory space (the portion being less than the whole of the block of the memory space). In an embodiment, an initial portion from the start of the block of memory space storing the primitive list is fetched, before any more of the block of memory space is fetched.

In other words, in an embodiment, when fetching the first block of memory space to be read for a primitive list, in an embodiment the fetching of that block of memory space is performed in at least two parts (and in an embodiment in two parts), comprising fetching a first, initial portion of the block of memory space (starting at the beginning of the block of the memory space), and then fetching more, e.g. a remaining portion or portions, of the block of memory space in dependence upon, and based on, the reading of the fetched first part of the block of memory space (i.e. such that any further fetching of the block of memory space after fetching the first portion of the block of memory space is performed, in an embodiment conditionally, after the first part has returned, in an embodiment based on information contained in (read from) the (fetched) first portion of the block of memory space).

In particular, and as will be discussed further below, in an embodiment, any further fetching of the first block of memory space for a primitive list after the initial portion of the (first) block of memory space has been fetched is only performed in the event that the result of reading the first portion of the block of memory space indicates that more of the block of memory space should be fetched (and read).

The Applicants have identified in this regard that when performing tile-based graphics processing, primitive lists are commonly either very short (e.g. containing only a few, e.g. only one or two primitives), or very long (containing many primitives), depending on the complexity of the geometry in the region of the graphics output that the primitive list relates to.

Accordingly, many primitive lists may be stored in single blocks of memory space, each containing only data to identify a small number of primitives. As such, the Applicants have identified that when fetching primitive lists to read to identify primitives for a tile of a graphics output, it can be beneficial to, at least for the first block of memory space in which a primitive list is stored, initially fetch only a (start) portion of that first block of memory space. For example, initially reading only a portion of the first block of memory space for a primitive list may allow unnecessary fetches if a primitive list is very short to be avoided.

The portion of the first block of memory space for a primitive list that is initially fetched in this regard may be any desired (start) portion of the first block of memory space.

In an embodiment, the portion of the (first) block of memory space that is initially fetched at least includes the portion of the block where the indication of the location in memory of an allocated next block of memory space used for storing the primitive list (and any associated, e.g. block size, information) would be stored (if present).

The portion of the first block of memory space that is initially fetched may be such that only the memory location reference (and any associated, e.g. block size, information) at the beginning of the block of memory space is fetched, or it may, for example, be such that both the memory location reference (and any associated, e.g. block size, information) and up to data for only a few, e.g. up to one or two, primitives (if present) at the beginning of the block of memory space are fetched.

In an embodiment, the memory location reference fetched as part of the fetched first portion of the first block of memory space for a primitive list is then used to determine whether any further data should be fetched for the primitive list.

In a such embodiment, it is determined whether the memory location indication indicates that there is another (a next) block of memory space in which the primitive list is stored (or not). In the case where the indication indicates that the primitive list is also stored in a next block of memory space, all of the remainder of the current (first) block of memory space is in an embodiment then fetched.

On the other hand, when the memory location indication instead other than indicates (does not indicate) that there is a next block of memory space for the primitive list (e.g. indicates a dummy (e.g. null) value, or a tail pointer location within the current (first) block of memory space (such that the block is the only block for the primitive list)), then it can be, and is in an embodiment, determined whether the portion of the memory space block that was initially fetched includes all the valid data within the current (first) block of memory space or not.

If the fetched portion included all the valid data within the current (first) block of memory space, then it can be, and is in an embodiment, determined that no further data needs to be fetched from the block of memory space.

If the portion did not include all the valid data within the current (first) block of memory space, then the remainder of the memory block, at least up until the end/tail of the primitive list is in an embodiment then fetched.

Thus, the method of technology described herein in an embodiment comprises (and the primitive list reading circuit is correspondingly in an embodiment configured to), when fetching the first block of memory space to be read for a primitive list, initially fetching only a portion of that block of memory space including at least the memory location reference in the first block of memory space, and when the memory location reference in the fetched first portion of the first block of memory space indicates a memory location outside the first block of memory space, fetching the rest of the first block of memory space.

In an embodiment, this process is also performed for a (and in an embodiment any) subsequent block (for subsequent blocks) of memory space in which a primitive list is stored (i.e. that is not the first block of memory space used for a primitive list) (i.e. to only fetch a first portion of the block of memory space and then fetch a further (e.g. remaining) portion of the block of memory space as appropriate), and in one embodiment this is what is done.

In another embodiment, a (and any) subsequent block of memory space for a primitive list (that is not the first block of memory space for the primitive list) is fetched without initially fetching only a portion of the block of memory space and then determining whether further data must be fetched for the block of memory space (i.e. the block of memory space is simply, and immediately, fetched in its entirety).

Thus, in an embodiment, when reading a block of memory space for a primitive list that is not the first block of memory space for the primitive list, all the data from that block of memory space is fetched, without initially fetching only a portion of the data for the block of memory space.

The Applicants have in this regard identified that if a primitive list is not stored in a single block of memory space (i.e. if it does not comprise only a few primitives), then it is likely to be stored in a larger number of blocks of memory space. Accordingly, fetch efficiency can be increased for blocks of memory space that aren't the first block of memory space for a primitive list by fetching the entirety of those (subsequent) blocks of memory space, as it is relatively unlikely that those (subsequent) blocks of memory space will not be full.

In the case where a preceding block of memory space also contains some indication of the amount of useful data in (e.g. a full/not full indication (flag)), and/or of the size of, the next block of memory space for a primitive list, then the fetching of the next block of memory space could be, and is in an embodiment, controlled in accordance with and based on that further block "content" and/or size indication. For example, where it is indicated that the next block of memory space used for a primitive list is "full", the block could simply immediately be fetched in its entirety, whereas when a block is indicated as being "not full", only a first portion of the block could be initially fetched (in the manner discussed above) (and in one embodiment this is what is done). Correspondingly, an indication of the size of the next block of memory space can be used to determine the amount of data in and the location in memory of that block of memory space.

Various other arrangements would be possible in this regard.

It would be possible to only fetch a next block of memory space for a primitive list (if any) when the preceding block of memory space for the primitive list has been fetched in its entirety, and/or fetched and read in its entirety.

However, in an embodiment, the fetching of a next block of memory space for a primitive list is triggered and performed in response to reading the indication of the location of the next block of memory space (the next block pointer) at the beginning of the previous block of memory space for the primitive list. In an embodiment the fetching of the next block of memory space is triggered once the next block indicator for the previous block of memory space has been read (and determined to point to a next block of memory space for the primitive list), and at least before all of the rest of the previous block of memory space has been read. In an embodiment the fetching of the next block of memory space is triggered (immediately) in response to the reading of the next block indication at the beginning of a previous block of memory space, and before the next entry in that block of memory space (i.e. before any of the primitive list content in that block of memory space) is read.

This will then have the effect of performing, in effect, a "pre-fetch" of the next block of memory space when it is known that there is a next block of memory space storing a primitive list, before the previous block of memory space storing the primitive list has been finished with, and should therefore increase the efficiency of the fetching and reading of the primitive list. Indeed, it is an advantage of the technology described herein that by storing the next block indications at the beginning of the memory space blocks storing the primitive lists, the fetching of a next block of memory space for a primitive list can be started before the previous preceding block of memory space has been read in its entirety.

Thus, in an embodiment, the method of the technology described herein comprises (and the primitive list reading circuit is configured to) once an indication of the location in memory of an allocated next block of memory space used for storing the primitive list has been read from the beginning of a block of memory space in which the primitive list is stored, starting to fetch that next block of memory space (into appropriate local storage) for use, before the remainder of the (current) block of memory space used for storing the primitive list has been read.

In these arrangements, where a next block of memory space for storing a primitive list is "pre-fetched" in this manner, then that "pre-fetching" could be configured and operate in any of the manners discussed above for the fetching of a subsequent block of memory space for a primitive list. Thus, for example, the pre-fetching could be configured simply to fetch the next block of memory space in its entirety (and in one embodiment, that is what is done), or to first fetch only a portion of the next block of memory space (and then fetch any remainder of the block of memory space in dependence upon the content of that first portion of the block of memory space) (and in another embodiment, that is what is done).

In the latter case, as discussed above for a first block of memory space for a primitive list, the fetched first portion of the block of memory space in an embodiment at least includes the memory location reference (pointer) (and any associated, e.g. block size, information) at the beginning of the block of memory space, and that memory location reference (and any associated, e.g. block size, information) fetched as part of the fetched first portion of the block of memory space for a primitive list is in an embodiment then used to determine whether any further data should be fetched from the block of memory space for the primitive list.

In a such embodiment, it is determined whether the memory location indication indicates that there is another (a next) block of memory space in which the primitive list is stored (or not). In the case where the indication indicates that the primitive list is also stored in a next block of memory space, all of the remainder of the next block of memory space is in an embodiment then fetched.

On the other hand, when the memory location indication instead other than indicates (does not indicate) that there is a next block of memory space for the primitive list (e.g. indicates a dummy (e.g. null) value, or a tail pointer location within the current (next) block of memory space (such that the block is the last block for the primitive list)), then it can be, and is in an embodiment, determined whether the portion of the next memory space block that was initially fetched includes all the valid data within the next block of memory space or not.

If the fetched portion included all the valid data within the next block of memory space, then it can be, and is in an embodiment, determined that no further data needs to be fetched from the next block of memory space.

If the portion did not include all the valid data within the next block of memory space, then the remainder of the next memory block, at least up until the end/tail of the primitive list is in an embodiment then fetched.

It would also or instead be possible, e.g., to fetch some or all of the next block of memory space based on an indication of the amount of content in the next block of memory space.

In an embodiment, the local storage into which the memory space block storing the primitive list is fetched (the read buffer) is configured to have sufficient capacity and the fetch process is configured to be (sufficiently) ahead of the processing of the read data, such that the first part of a memory space block can be requested and returned, and it then checked how much of the block should be read (e.g. whether the block is "full"), before fetching the (any) remaining part of the block, without that causing any delay in the processing of the primitive list data.

Indeed, it is an advantage of the technology described herein that by putting the link pointer at the beginning of a memory space block, by the time the final read request for a current block of memory space storing a primitive list has been issued, the data from the first read request to that current block (to read the beginning of the current block) should have (and in an embodiment has) returned, such data can be continued to be requested from the next block (as indicated by the pointer at the beginning of the current block) once the current block is finished without the need for (without there being) a delay in the issuing of the read requests.

In an embodiment, the configuration (and in particular the size) of the memory space blocks that are allocated for storing primitive lists is also configured and arranged to take advantage of the recognition by the Applicants that primitive lists may commonly either identify only a few primitives, or will contain many primitives (as well as the fetching of the primitive lists for use being configured and arranged to take account of that recognition).

Thus, in an embodiment, the first block of memory space that is allocated to a primitive list (in which a primitive list is stored) is smaller than any subsequent blocks of memory space (if any) that are allocated for storing the primitive list. In an embodiment, the first block of memory space allocated to a primitive list is smaller than any subsequent blocks of memory space allocated for storing the primitive list (with all the subsequent blocks in an embodiment all being the same, relatively larger size).

Thus in an embodiment, the allocating of blocks of memory space for storing a primitive list comprises (and the memory space allocation circuit is correspondingly configured to), when no previous blocks of memory space have been allocated for storing a primitive list, allocating a first block of memory space for storing the primitive list having a first size, and for any subsequent blocks of memory space to be used for storing the primitive list allocating a block of memory space having a second size, wherein the second size is greater than the first size.

Thus in an embodiment, the first block of memory space in which a primitive list is stored is smaller than subsequent blocks of memory space in which the primitive list is stored. For example, the first block of memory space for a primitive list may comprise 128 B and subsequent blocks of memory space may comprise 512 B. Of course, any other suitable sizes may also be used as appropriate.

(As discussed above, in an embodiment, the size of a next memory space block is indicated at the beginning of a (the preceding) memory space block to facilitate this operation.)

Providing a first block of memory space for a primitive list that is smaller than subsequent blocks of memory space for the list allows primitive lists identifying only one or two primitives to be stored without less "empty" space in the first block of memory space, whilst using larger subsequent blocks of memory space for a primitive list helps to ensure that the number of memory blocks required for larger primitive lists is not too high, thereby reducing the processing required when storing and reading the primitive lists.

The technology described herein also extends to the reading of primitive lists configured in the manner of the technology described herein.

Thus, an embodiment of the technology described herein comprises a method of reading primitive lists in a tile-based graphics processing pipeline in which a graphics processing output to be generated is divided into a plurality of tiles for rendering purposes, with each tile of the graphics processing output being rendered separately, in which one or more primitive lists indicating graphics primitives to be processed for respective regions of the graphics output are stored in one or more blocks of memory space, with each block of memory space used for a primitive list storing at its beginning an indication of a location in memory, the method comprising:

when reading a block of memory space storing a primitive list:
reading the indication of a location in memory from the beginning of the block of memory space;
determining whether the indication of a location in memory read from the beginning of the block of memory space indicates a location in memory of an allocated next block of memory space used for storing the primitive list; and
when the indication of a location in memory read from the beginning of the block of memory space indicates a location in memory of an allocated next block of memory space used for storing the primitive list, using the read indication of the location in memory of the allocated next block of memory space to fetch the allocated next block of memory space used for storing the primitive list.

Another embodiment of the technology described herein comprises a primitive list reading circuit for a tile-based graphics processing pipeline in which a graphics processing output to be generated is divided into a plurality of tiles for rendering purposes, with each tile of the graphics processing output being rendered separately, in which one or more primitive lists indicating graphics primitives to be processed for respective regions of the graphics output are stored in one or more blocks of memory space, with each block of memory space used for a primitive list storing at its beginning an indication of a location in memory, wherein the primitive list reading circuit is configured to:

read primitive lists to identify graphics primitives to process for a tile of a graphics processing output to be rendered; and
when reading a block of memory space storing a primitive list:
read the indication of a location in memory from the beginning of the block of memory space;
determine whether the indication of a location in memory read from the beginning of the block of memory space indicates a location in memory of an allocated next block of memory space used for storing the primitive list; and
when the indication of a location in memory read from the beginning of the block of memory space indicates a location in memory of an allocated next block of memory space used for storing the primitive list, use the read indication of the location in memory of the allocated next block of memory space to fetch the allocated next block of memory space used for storing the primitive list.

As will be appreciated by those skilled in the art, these embodiments of the technology described herein may, and in an embodiment do, include any one or more or all of the optional features of the technology described herein, as appropriate.

For example, and in an embodiment, the fetching of the allocated next block of memory space is in an embodiment begun before the primitive list reader has finished reading the (current) block of memory space (from which the indication of the location in memory of the allocated next block of memory space was read).

Similarly, in the case where the indication of a location of memory read from the beginning of the block of memory space is determined not to indicate the location in memory of an allocated next block of memory space (e.g. because the indication of a location in memory is a dummy (e.g. null) value or a tail pointer for the primitive list), in an embodiment at least any remaining part of the current block of memory space that contains valid data is fetched for reading by the primitive list reader (if it has not already been fetched), but no further blocks of memory space are fetched for reading for the primitive list in question.

Similarly, when fetching the allocated next block of memory space, only a portion of that next block of memory space may be fetched initially, or the next block of memory space could be fetched in its entirety.

The primitive list reading process (and circuit) similarly in an embodiment uses any other information, such as a size indication, and/or a "full" indication, from the beginning of a current memory space block to control the fetching of the allocated next block of memory space for a primitive list.

The primitive list reading process (and circuit) correspondingly in an embodiment uses an indication of the start of the primitive list in memory (a head pointer for the primitive list) to identify and fetch the first block of memory space used for the primitive list (and then starts to read that first block of memory space).

Correspondingly, in an embodiment, the primitive list reader uses an indication of the last position in memory used for storing the primitive list (a tail pointer for the primitive list) to determine when the end of the primitive list has been reached.

The reading process in an embodiment also keeps track of the current position in the primitive list that the reading process has reached, and, in an embodiment, compares this to the position of the end of a memory space block that is being read for a primitive list to determine when the end of that block has been reached (and so the next block needs to be read), and/or also to the position of the end of the primitive list, to determine when the end of the primitive list has been reached.

The graphics processor (and system) of the technology described herein can be any suitable and desired (tile-based) graphics processor (and system) which is operable to generate a useful graphics output.

The graphics output to be generated may comprise any suitable output that can be generated by a graphics processor, such as a frame for display, or render-to-texture output, etc. The output data values from the processing are in an embodiment exported to external, e.g. main, memory, for storage and use, such as to a frame buffer for a display. In an embodiment, the graphics output is an output frame in a sequence of plural output frames (e.g. to be displayed) that the graphics processor (and system) generates.

The graphics processor (graphics processing unit (GPU)) should, and in an embodiment does, execute a graphics processing pipeline. The graphics processor can execute any suitable and desired graphics processing pipeline, and may and in an embodiment does, include any suitable and desired processing circuits, processing logic, components and elements for that purpose.

The graphics processing pipeline that the graphics processor executes can include any suitable and desired processing stages for generating a (the) graphics output (e.g. frame). Thus, the graphics processing pipeline can include, and in an embodiment does include any one or one or more, and in an embodiment all, of the processing stages that graphics processing pipelines normally include. Thus, for example, the graphics processing pipeline in an embodiment includes a vertex shading stage, primitive setup stage, a rasteriser and a renderer. In an embodiment the renderer is in the form of or includes a fragment shader.

The graphics processing pipeline may also contain any other suitable and desired processing stages that a graphics processing pipeline may contain such as a depth (or depth and stencil) tester, a blender, etc. As the pipeline is a tile-based pipeline, the pipeline in an embodiment also comprises a tiling stage, and/or a tile buffer for storing tile sample values and/or a write out unit that operates to write the data in the tile buffer (e.g. once the data in the tile buffer is complete) out to external (main) memory (e.g. to a frame buffer).

A (and each) processing stage (circuit) of the graphics processing pipeline (processor) can be implemented as desired, e.g. as a fixed function hardware unit (circuit) or as a programmable processing circuit (that is programmed to perform the desired operation). In an embodiment, at least the vertex shading stage and/or the fragment shading stage are implemented by a programmable execution unit (shader core) of the graphics processor executing an appropriate shader (program) that is in an embodiment supplied by the application that requires the graphics processing.

The graphics processing system can include any (other) suitable and desired components. In an embodiment, the graphics processing system includes a host processor which is operable to issue graphics processing commands (and data) to the graphics processor (GPU).

Thus, the graphics processing pipeline is in an embodiment executed (by the graphics processor (GPU)) in response to commands issued by a host processor of the graphics processing system. The host processor can be any suitable and desired processor, such as and in an embodiment a central processing unit (CPU), of the graphics processing system.

In an embodiment, the host processor of the graphics processing system generates the graphics processing commands (and data) for the graphics processor (GPU) in response to instructions from an application executing on the host processor. This is in an embodiment done by a driver for the graphics processor (GPU) that is executing on the host processor.

The graphics processing system should, and in an embodiment does, (further) comprise a memory. The memory can be any suitable and desired storage. The memory may be an on-chip memory (i.e. on the same chip as the host processor and/or the graphics processor) or it may be an external (main) memory (i.e. not on the same chip as the host processor and/or the graphics processor). Where the memory is an external memory, it may be connected to the host processor and/or to the graphics processor by a suitable interconnect.

In an embodiment, the various functions of the technology described herein are carried out on a single graphics processing platform that generates and outputs data (such as rendered fragment data that is, e.g., written to the frame buffer), for example for a display device.

The technology described herein can be implemented in any suitable system, such as a suitably configured microprocessor based system. In an embodiment, the technology described herein is implemented in a computer and/or micro-processor based system.

The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuits, circuitry, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

FIG. 1 shows an exemplary system on chip (SoC) graphics processing system 8 that comprises a host processor comprising a central processing unit (CPU) 1, a graphics processor (GPU) 2, a display processor 3, and a memory controller 5. The exemplary data processing system may also comprise a video engine (not shown in FIG. 1). As shown in FIG. 1, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 9 such as a game, executing on one or more host processors (CPUs) 1 will, for example, require the display of frames on the display panel 7. To do this, the application will submit appropriate commands and data to a driver 10 for the graphics processor 2, e.g. that is executing on a CPU 1. The driver 10 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

In the present embodiment, the graphics processor 2 executes a graphics processing pipeline that processes graphics primitives, such as triangles, when generating an output, such as an image for display.

Figure 2:
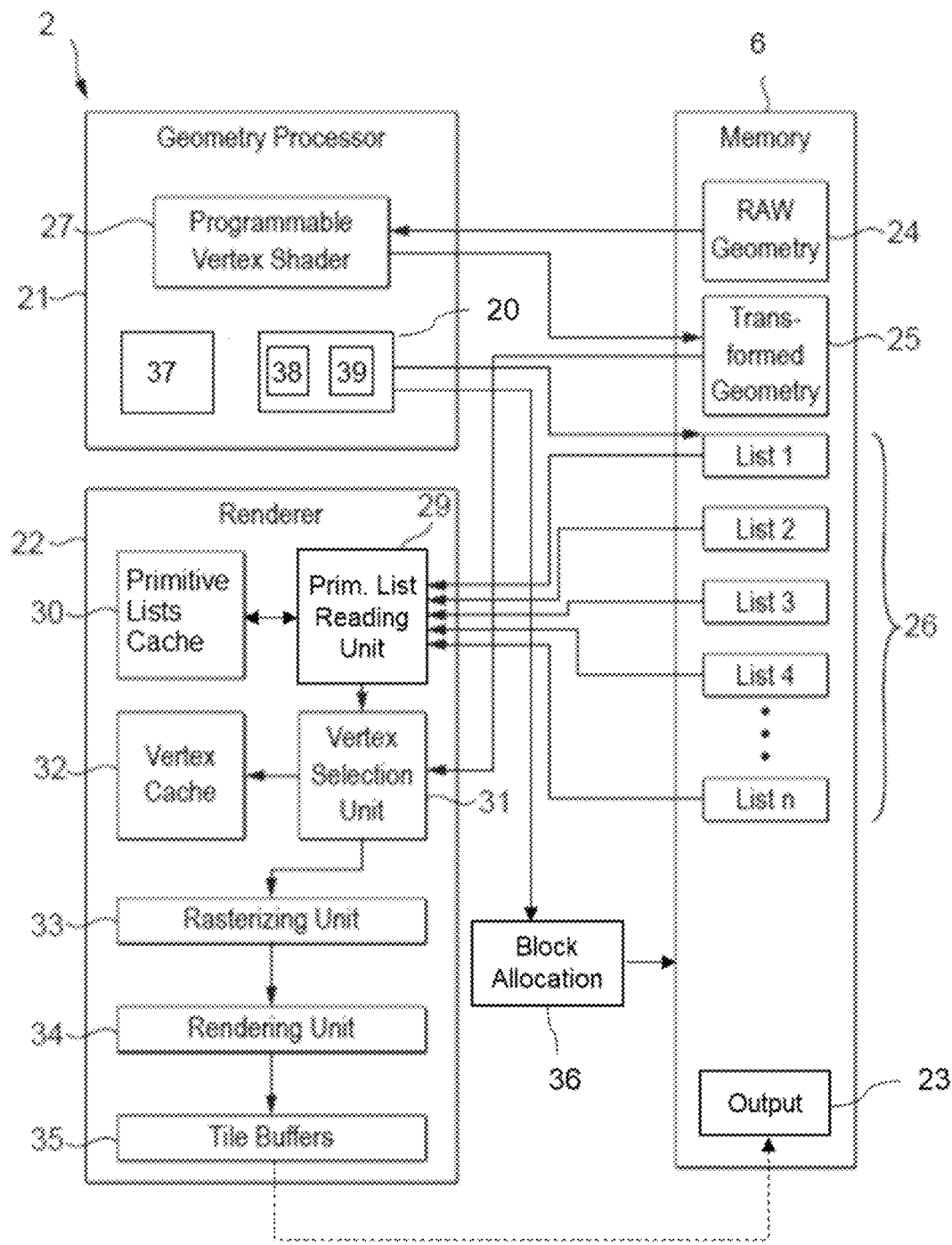
FIG. 2 shows schematically a graphics processor that may be operated in accordance with an embodiment of the technology described herein.

FIG. 2 shows schematically a graphics processor 2 that may be operated in accordance with the technology described herein. FIG. 2 shows the main elements and pipeline stages/circuits of the graphics processor 2 that are relevant to operation in the manner of the technology described herein. As will be appreciated by those skilled in the art there may be other elements of the graphics processor and processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processor and processing pipeline as shown in FIG. 2 may, unless otherwise indicated, be implemented as desired and will accordingly comprise, e.g., appropriate circuitry, circuits and/or processing logic, etc., for performing the necessary operation and functions.

The graphics processor 2 includes a geometry processor 21, and a renderer 22, both of which can access a memory 6. The memory 6 may be "on chip" with the geometry processor 21 and renderer 22, or may be an external memory that can be accessed by the geometry processor 21 and renderer 22.

The memory 6 stores, inter alia, and as shown in FIG. 2, a set of raw geometry data 24 (which is, for example, provided by the graphics processor driver or an API running on a host system (microprocessor) of the graphics processor 2), a set of transformed geometry data 25 (which is the result of various transformation and processing operations carried out on the raw geometry 24), and a set of primitive lists 26.

Each primitive list 26 corresponds to a particular region (in the present embodiment, tile) of the render output being generated, and contains a list of primitives to be rendered for that region (tile).

The transformed geometry data 25 comprises, for example, transformed vertices (vertex data), etc.

The geometry processor 21 comprises, inter alia, a programmable vertex shader 27, a primitive assembly stage 37, and a tiling unit (a tiler) 20 comprising a primitive binning unit 38 and a primitive list writing unit 39.

The programmable vertex shader 27 takes as it input the raw geometry data 24 stored in the memory 6, and processes that data to provide transformed geometry data 25 (which it then stores in the memory 23) comprising the geometry data in a form that is ready for two-dimensional ('2D') placement in the frame to be displayed. The programmable vertex shader 27 and the processes it carries out can take any suitable form and be any suitable and desired such processes.

The primitive assembly stage 37 takes as its input the transformed and processed vertex data from the programmable vertex shader 27, and assembles geometric primitives using that data.

The tiling unit 20 carries out the tiling and primitive list writing processes, in order to generate primitive lists 26 which are subsequently used by the renderer 22. To do this, the tiling unit 20 takes as its input the assembled primitives from the primitive assembly stage 37. The binning unit 38 of the tiling unit 20 determines the regions (tiles) of the render output that a primitive (at least partially) falls within (e.g. using a bounding box technique), and the primitive list writing unit 39 writes "binned" primitives to primitive lists 26 which are stored in memory 6.

The renderer 22 includes a primitive list reading unit 29, a primitive list cache 30, a vertex selection unit 31, a vertex data cache 32, a rasterising unit 33, a rendering unit 34, and tile buffers 35. The renderer operates on a tile-by-tile basis.

The rasterising unit 33, rendering unit 34, and tile buffers 35 operate, in this embodiment, in the same manner as such units normally operate in graphics processing systems. Thus the rasterising unit 33 takes as its input a primitive and its vertices, rasterises the primitive to fragments, and provides those fragments to the rendering unit 34. The rendering unit 34 then performs a number of rendering processes, such as texture mapping, blending, fragment shading, etc. on the fragments, to generate rendered fragment data for the fragments.

The output of the rendering 34 (the rendered fragments) is written to a tile buffer 35. Once the processing for the tile in question has been completed, then the tile will be written to an output data array 23 in memory, and the next tile processed, and so on, until the complete output data array has been generated. The process will then move on to the next output data array (e.g. frame), and so on.

The output data array may typically be an image (a frame) intended for display on a display device, such as a screen or printer, but may also, for example, comprise intermediate render data intended for use in later rendering passes (also known as a "render to texture" output), or for deferred rendering, or for hybrid ray tracing, etc.

The primitive list reading unit 29 of the renderer 22 determines which primitive is to be rendered next. It does this by considering the primitive list(s) 26 stored in the memory 6 that apply to the tile being rendered, and reading from that list(s) the next primitive to be rendered.

To do this, the primitive list reading unit 29 first fetches the required primitive list(s) into the primitive list cache 30, and then reads the cached primitive list(s) to determine the primitive to be rendered next.

The primitive list reading unit 29 provides the primitive that it has read for rendering next to the vertex selection unit 31. In response to this, the vertex selection unit 31 retrieves the appropriate transformed vertex data for the primitive in question from the transformed geometry data 25 stored in the memory 23, and then provides the primitive (i.e. its transformed vertex data) to the rasterising unit 33 for processing. The vertex selection unit 31 can cache vertex data that it has retrieved from the memory 23 in the vertex data cache 32, if desired.

As discussed above, the technology described herein and the present embodiments relate in particular to the generation and storing, and then use, of the primitive lists 26 that are generated by the tiler 20 and stored in the memory 6.

FIGS. 3-8 illustrate this operation in various embodiments of the technology described herein.

In the present embodiments, the primitive lists are stored in respective sequences of one or more memory space blocks that have been allocated from the memory 6 for the purpose of storing the primitive lists. Furthermore, and in accordance with the technology described herein, each memory space block that has been allocated for storing a primitive list includes at its beginning an appropriate link pointer, indicating, in the case of a block other than the final block for the primitive list, the location in memory of the next memory space block that the primitive list in question is stored in.

In addition to this, at least when generating the primitive lists, a separate pointer array, storing respective head pointers and tail pointers for each of the primitive lists that are being prepared is also stored in the memory 6.

Figure 3:
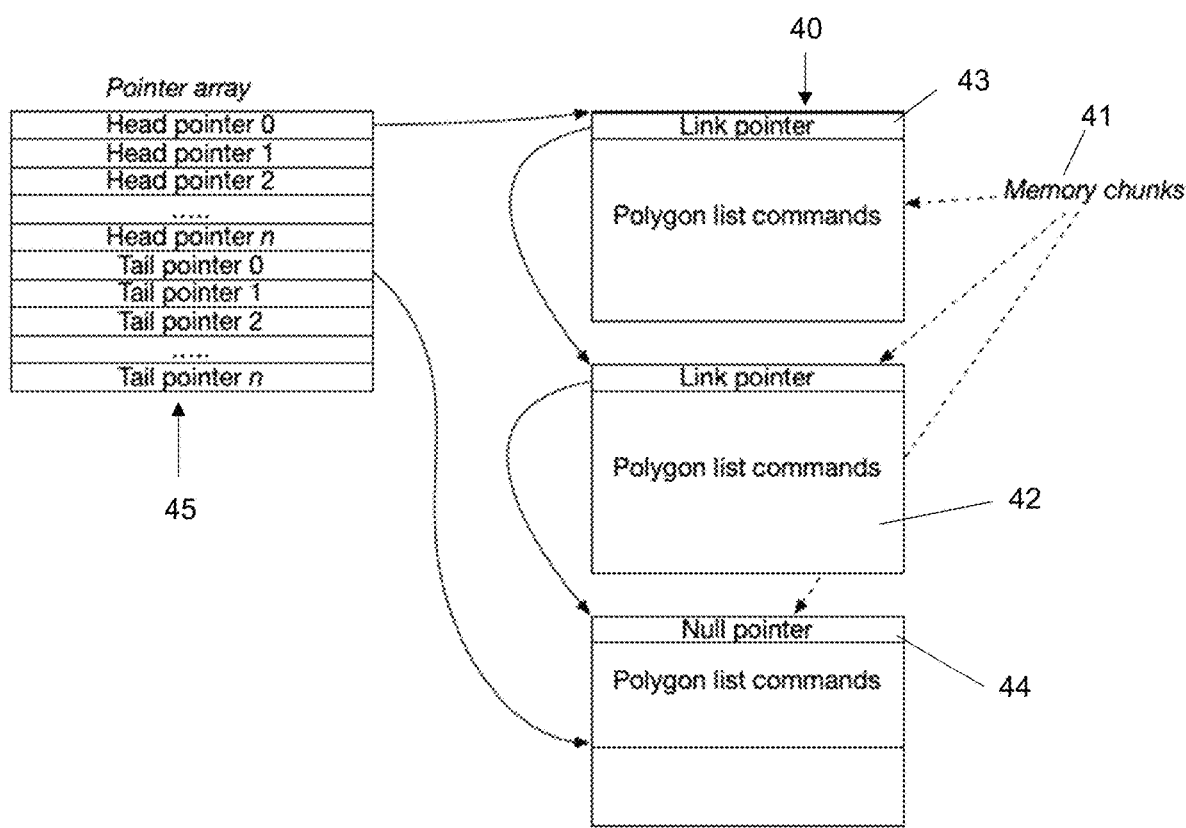
FIG. 3 schematically illustrates the storing of primitive lists in linked lists of memory space blocks in an embodiment of the technology described herein.

FIG. 3 shows this arrangement in a first embodiment of the technology described herein.

Figure 4:
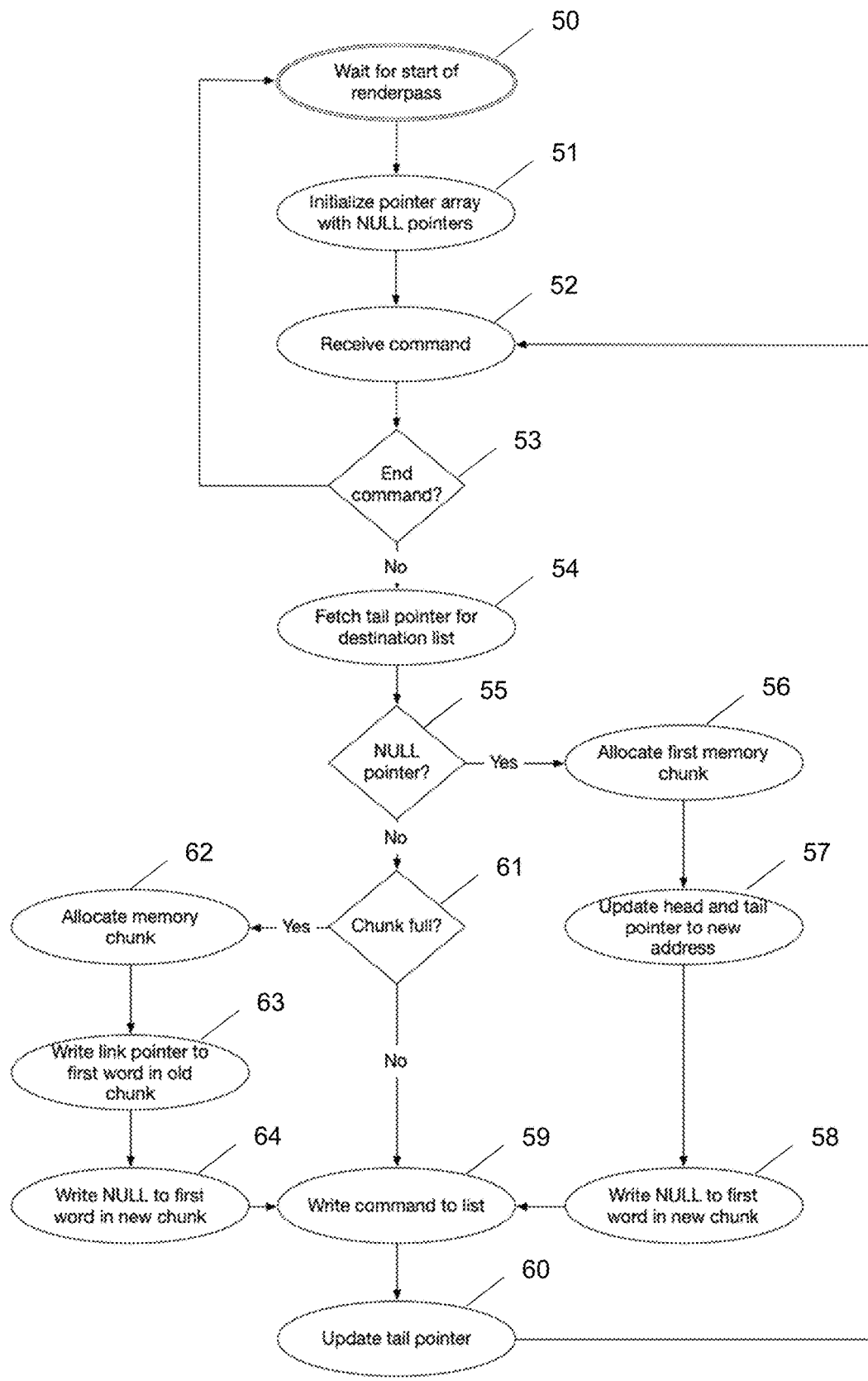
FIG. 4 is a flow chart showing the generation of primitive lists as shown in FIG. 3 in an embodiment of the technology described herein.

As shown in FIG. 3, a respective primitive list 40 (primitive list "0" in the example shown in FIG. 3) is stored as a sequence of linked memory space blocks (chunks) 41, which each contain respective primitive list commands 42 defining the primitive list, together with, at the beginning of each memory chunk 41, an appropriate pointer 43 indicating, as shown in FIG. 4, the location of the next memory space block that has been used to store the primitive list, or, in this embodiment, in the case of the final memory space block that has been used to store the primitive list, a null pointer 44.

As is also shown in FIG. 3, an appropriate pointer array 45 storing head and tail pointers for the respective primitive lists that are being prepared is also maintained as the primitive lists are being generated.

FIG. 4 is a corresponding flow chart showing the generation of primitive lists of the form shown in FIG. 3.

Thus, as shown in FIG. 4, when a new render pass is started (for which a primitive list needs to be prepared) (step 50), the pointer array 45 will first be initialised with null (dummy) pointers (step 51). The primitive list writing process will then receive a primitive list command to be written to a primitive list (step 52) and determine whether the command is an end of render pass command (step 53) (which will indicate that the current set of primitive lists are complete and therefore the primitive list generation process should start again when the next render pass is started).

As shown in FIG. 4, when the received primitive list command is not an end render pass command (i.e. is a command that should be written to a primitive list), the primitive list writing process 39 of the tiler 20 will identify which primitive list the command should be written to (the destination list for the command) and fetch the tail pointer from the pointer array 45 for that primitive list (step 54).

When the tail pointer for the required primitive list is a null pointer (i.e. indicating that the primitive list has not been started yet), then a first block of memory space is allocated for storing the primitive list (steps 55 and 56). In this case, the head and tail pointer for the primitive list in the pointer array 45 are correspondingly be updated to indicate the allocated memory space block (chunk) (step 57).

The tiler will then write a null (dummy) pointer to the first word in the new memory space block (step 58) (this is so as to leave space for writing the link pointer to the next memory space block for the primitive list (if any) at the beginning of the memory space block), and then write the received primitive list command (immediately) after that first word in the memory space block (step 59), and update the tail pointer for the primitive list in the pointer array 45 to account for the null pointer and command that has been written to the memory space block for the primitive list (step 60).

The process will then wait for the next primitive list command to be written to a primitive list, and so on.

As shown in FIG. 4, in the case where at step 55 it is determined that there is already an existing memory space block storing the primitive list to which the primitive command is to be added (i.e. the tail pointer for the destination primitive list is not "null"), then it is determined whether the memory space block that is currently being used for the primitive list is full or not (step 61).

In the case where the current memory space block for the primitive list is not full, then the new primitive list command is written to the end of the list in that memory space block, the tail pointer for the primitive list updated accordingly, and the next primitive list command to be written awaited (steps 59, 60 and 52).

On the other hand, where at step 51 it is determined that the current memory space block being used to store a primitive list is full, then a new memory space block is allocated for storing the primitive list in question (step 62), and a link pointer to that next allocated memory space block is written into the first word in the current (now full) memory space block (thereby replacing the "null" entry in the first word in the current (now full) memory space block) (step 63).

A null value is then appropriately written to the first word in the newly allocated memory space block (step 64), and then the new command is written to the next word in the new memory space block, the tail pointer is updated and the next command to be written is awaited (steps 59, 60 and 52).

This process is repeated until all of the primitive list commands for the render pass being generated have been written to the appropriate primitive lists by the tiler 20.

As discussed above, in the primitive list generation and storing operation shown in FIG. 4, respective blocks of memory space (memory chunks) will be allocated for storing a primitive list. In order to facilitate this operation, the graphics processing system further comprises, as shown, in FIG. 2, a memory block allocation circuit 36 that is operable to allocate blocks of space in the memory 6 for storing primitive lists in response to requests for such block allocation from the tiler 20 as it is writing the primitive lists. The memory block allocation circuit 36 can operate to allocate blocks of memory for storing primitive lists in any suitable and desired manner, such as in accordance with the normal manner for memory allocation in the graphics processing system in question.

For example a memory block pool comprising plural memory space blocks (chunks) may be set aside in the memory 6 for storing primitive lists, with each block of memory space being, e.g., initially set aside for use by the graphics processor by the host processor 1, and comprising a set of contiguous memory addresses in memory 6. The memory block allocation circuit 36 may then allocate memory space blocks from the pool of blocks for use for storing a primitive list, as appropriate, and as required.

Figure 5:
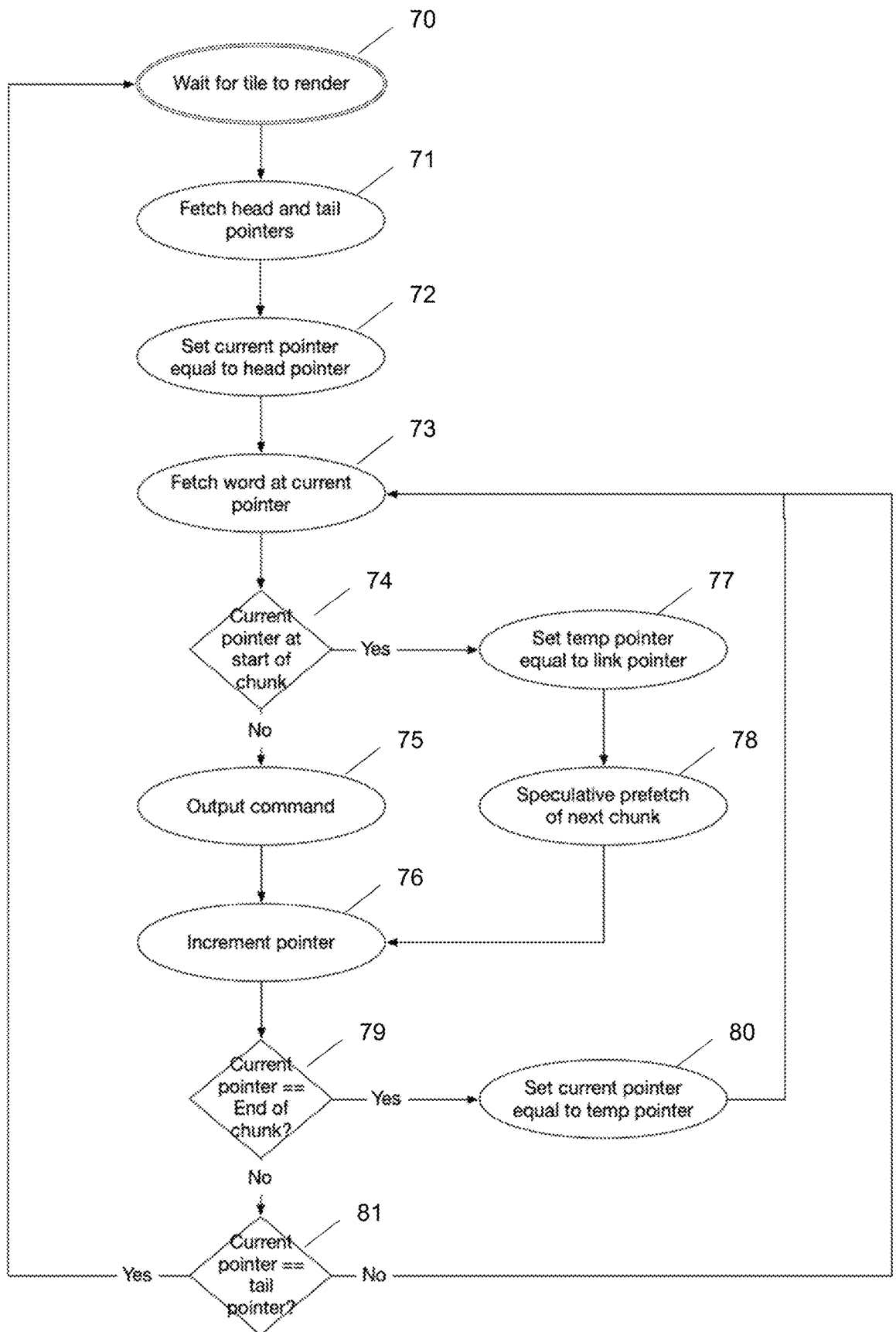
FIG. 5 is a flow chart showing the reading of primitive lists as shown in FIG. 3 in an embodiment of the technology described herein.

FIG. 5 shows the corresponding operation when using a primitive list of the form shown in FIG. 3 (and generated using the process shown in FIG. 4).

When using a primitive list, as shown in FIG. 5, the primitive list reading process 29 will wait for a tile to render (step 70), and when there is a tile to render, fetch the head and tail pointers from the pointer array 45 for a primitive list for the tile in question (step 71).

The primitive list reading process will then set the current read pointer (i.e. indicating where the reading of the primitive list has reached) to the head pointer for the primitive list being read (step 72).

The primitive list reader will then fetch the data word at the current pointer position (step 73) and determine whether the current pointer position is at the start (beginning) of a block memory space storing the primitive list or not (step 74).

(The first block for a primitive list may, if desired, be appropriately pre-fetched into more local storage, to reduce latency when reading a primitive list. In this case the entirety of the first memory space block for a primitive list could be "pre-fetched", or only a first portion, e.g. the first data entry (word), for the first block for the primitive list, could be pre-fetched and then read to determine whether more of the block will be needed, and thereafter if and as, appropriate, some or all of the remaining part of the first block storing the primitive list then fetched.)

When the current pointer position is not at the start of a memory space block storing a primitive list, then, as shown in FIG. 5, the primitive list reader will output the primitive list command stored at the current pointer position (step 75) and update the current read position pointer accordingly (step 76).

On the other hand, when the current read pointer is at the start of a memory space block, then the primitive list reader will read the link pointer to the next memory space block that is stored at the beginning of the memory space block that is being read. In that case, a temporary pointer record is then set equal to the read link pointer (pointing to the next memory space block for the primitive list) (step 77), and a "speculative" pre-fetch of the next memory space block storing the primitive list using the read link pointer is performed (step 78) (this will be discussed in more detail below).

The current read position pointer for the current memory space block for the primitive list is then correspondingly updated (step 76).

In either case, once a primitive list has been read and the current pointer updated to the next position to be read, it is then determined whether the current (updated) read pointer position is at the end of the memory space block that is currently being read (step 79).

This may be determined in any suitable and desired manner, for example based on knowledge of the size of the memory space block that is being read.

(As discussed, the size of a memory space block may be indicated at the beginning of the preceding memory space block, along with the link pointer to the next memory space block.)

If so, the current read pointer for the primitive list in question is set equal to the set temporary pointer (i.e. the link pointer read from the memory space block that has just been finished) (step 80), such that the next read of a memory space block for the primitive list in question will be at the start of the next memory space block in which the primitive list is stored.

In the case where the current read pointer is not at the end of a memory space block, it is then determined whether the current (updated) read position pointer for the memory space block is equal to the tail pointer stored in the pointer array 45 for the primitive list in question (step 81).

If the current read pointer (after being incremented) is equal to the tail pointer for the primitive list in question, that indicates that the entirety of the primitive list has been read, and so the process can revert to waiting for a next tile to render (or primitive list to read). On the other hand, if the tail (end) of the primitive list being read has not yet been reached, then the process returns to step 73 to read to the next part of the primitive list, and so on.

As discussed above, in the case where the start (first word) of a memory space block storing a primitive list is read (and such that a link pointer to a next memory space block storing the primitive list in question is read), that link pointer to the next memory space block for storing the primitive list is used for and to trigger a "speculative" pre-fetch of the next memory space block storing the primitive list in question (at step 78 in FIG. 5).

In the present embodiment, as the tail pointer for the primitive list being read is known before the first memory space block is read (as it was fetched in step 71), the "speculative" pre-fetch of the next memory space block can be configured to read as much data as is needed from the next memory space block, based on the known tail pointer. For example, if the tail pointer is not within the next block, then the whole of the next block can simply be read. On the other hand, if the tail pointer is within the next block, then the next block is read from the beginning of the block (only) up to the tail pointer position.

An appropriate indication of the size of the next memory space block for a primitive list can be associated with the link pointer, with the pre-fetch operation then using the indicated size of the next memory space block to control the fetching of that memory space block. Various arrangements would be possible in this regard.

Figure 6:
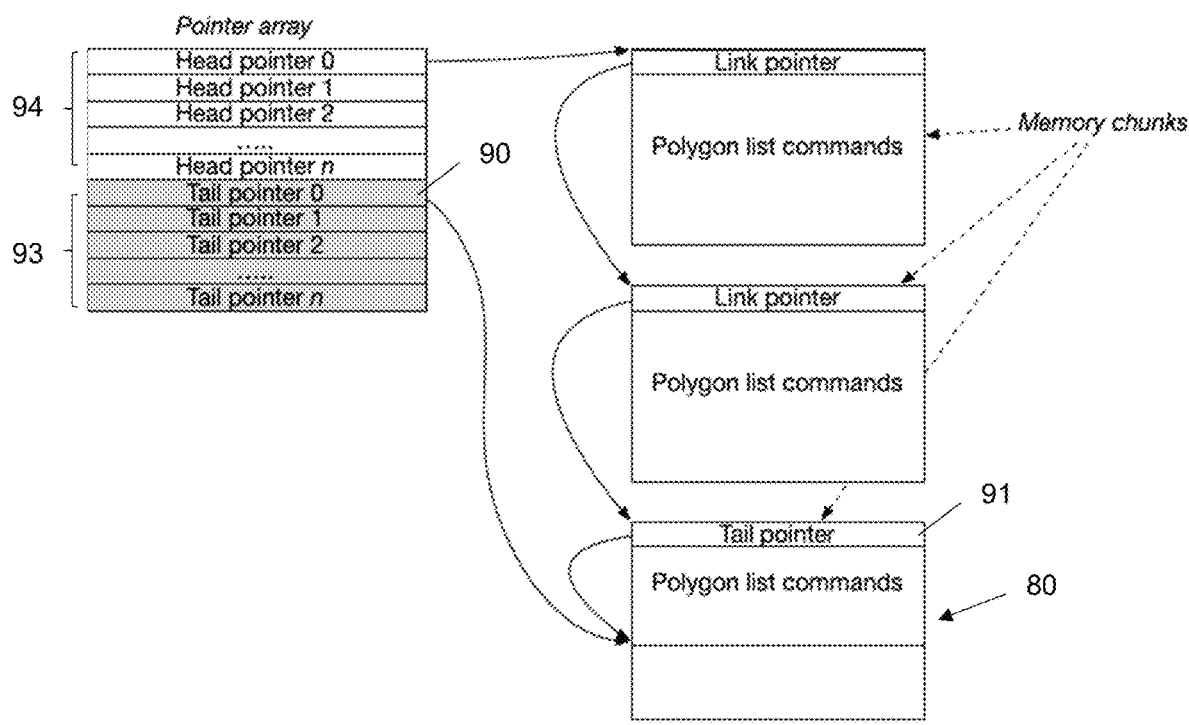
FIG. 6 schematically illustrates the storing of primitive lists in linked lists of memory space blocks in another embodiment of the technology described herein.
Figure 7:
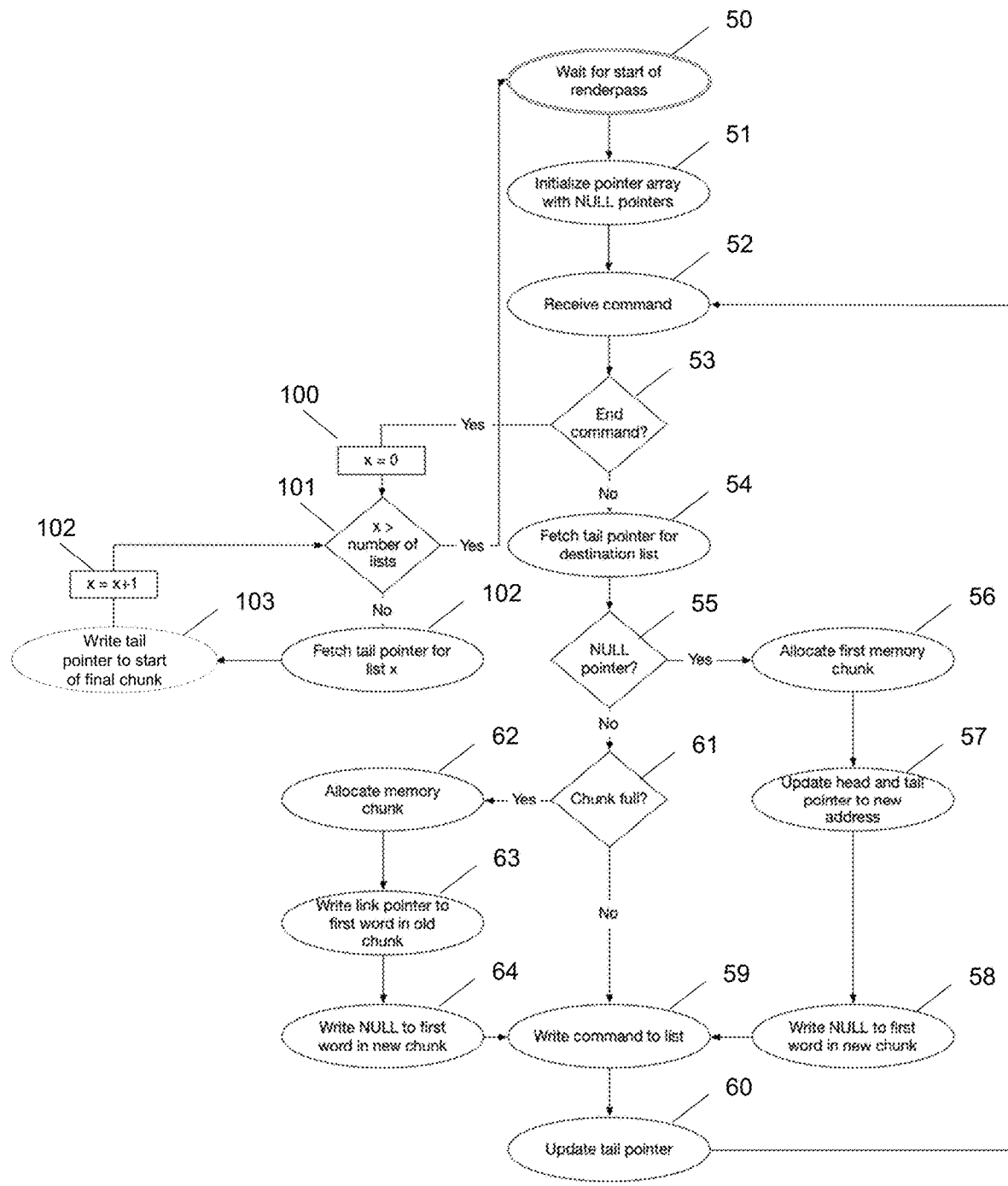
FIG. 7 is a flow chart showing the generation of primitive lists as shown in FIG. 6 in an embodiment of the technology described herein.
Figure 8:
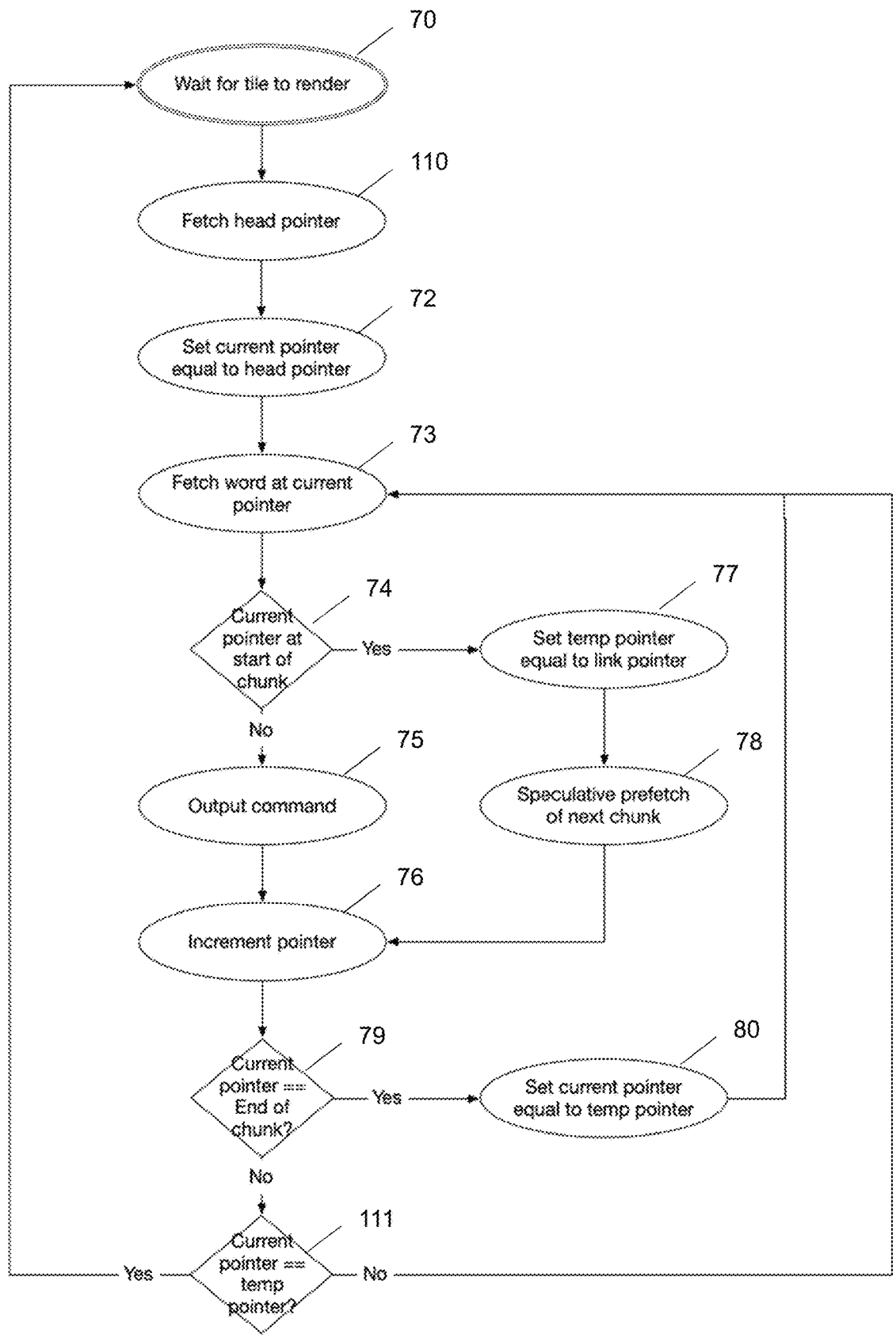
FIG. 8 is a flow chart showing the reading of primitive lists as shown in FIG. 6 in an embodiment of the technology described herein.

FIGS. 6, 7 and 8 show an alternative embodiment of the technology described herein, in which rather than providing the tail pointers to the primitive list reading process as part of a separate pointer array (as in the case in the embodiment shown in FIGS. 3, 4 and 5), the tail pointers for the primitive lists are instead written to the beginning of the final block of memory space that is used for a primitive list (instead of leaving a null pointer as the first word in the final block of memory space for a primitive list as is the case in the arrangement shown in FIG. 3).

FIG. 6 illustrates this, and shows that when writing the primitive lists, the pointer array 45 still includes both head and tail pointers for each primitive list (to facilitate the writing process), but then when a primitive list is finished, the tail pointer 90 for the primitive list is written to the first word 91 in the final block of memory space 92 for the primitive list in question. This is done for each of the primitive lists, such that each primitive list will store its respective tail pointer at the beginning of the final block of memory space used for the primitive list. The tail pointers 93 in the pointer array 45 are then discarded, such that the pointer array that is provided for the primitive list reading process only comprises the head pointers 94 for each primitive list.

FIG. 7 shows the generation of the primitive lists in this embodiment. As can be seen from FIG. 7, the operation when generating and writing a primitive list, up until the end command for the render pass is received, is the same as described above with reference to FIG. 4 (and so will not be repeated here).

However, in this embodiment, when the end of render pass command is received at step 53, a further primitive list "finalise" process is performed, to write the tail pointers for each of the primitive lists to the start of the respective final memory space blocks for the primitive lists.

Thus, as shown in FIG. 7, when an end of render pass is identified at step 53, a finalise process that iterates (steps 100, 101, 104) over all of the primitive lists for the render pass is performed, in which for each primitive list, the tail pointer for the list is fetched from the pointer array 45 (step 102) and written to the start (to the first word) of the final memory space block for the primitive list in question (step 103). Once this has been done for all of the primitive lists for the render pass in question, the primitive list writing process for that render pass is complete, and so the next render pass can be awaited.

FIG. 8 shows the corresponding reading of a primitive list in this embodiment. Again, as shown in FIG. 8, the reading process is substantially the same as the process shown in FIG. 5 (and so the common steps in the reading process will not be repeated here), but in this case, firstly, rather than fetching both the head and tail pointers in the pointer array at step 71 when first reading a primitive list only the head pointers are fetched (as discussed above with reference to FIG. 6) (step 110).

Correspondingly, rather than comparing the current read pointer to a tail pointer from the pointer array (step 81 in FIG. 5), instead the current read pointer is compared to the temporary pointer that has been set equal to and read from the pointer at the start of the memory space block to determine whether the end (the tail) of the primitive list has been reached (step 111) (since the link pointer at the start of the final block for a primitive list that the temporary pointer will be set to will in this embodiment be the tail pointer for the primitive list in question, and so when the read pointer reaches that temporary pointer position for the final block for a primitive list, that will indicate that the end of the primitive list has been reached).

Also, as in this embodiment the tail pointer is not known when the pre-fetch of a next memory block is performed (in step 78), the "speculative" pre-fetch of the next memory space block can be configured and operate as desired. For example, it could simply fetch the entirety of the next memory space block based on the link pointer (and any block size) indication (and in one embodiment that is what is done). Alternatively only a first portion (but not all) of the next memory space block could be pre-fetched and then read to determine whether more of the block will be needed, and thereafter if and as, appropriate, some or all of the remaining part of the next block storing the primitive list then fetched.

As will be appreciated from the above, the technology described herein, in its embodiments at least, can provide for more efficient fetching and reading of primitive lists in a tile-based graphics processing system. This is achieved in the embodiments of the technology described herein at least, by storing primitive lists in respective, separate and distinct, blocks of memory space, and including a link pointer to the next block of memory space used for a primitive list at the beginning (rather than at the end) of a block of memory space used for a primitive list.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of preparing and storing primitive lists for use in a tile-based graphics processing system in which a graphics processing output to be generated is divided into a plurality of tiles for rendering purposes, with each tile of the graphics processing output being rendered separately, the method comprising:
   preparing and storing a primitive list indicating graphics primitives to be processed for each of one or more regions of the graphics processing output;
   wherein preparing and storing a primitive list comprises:
      allocating a first block of memory space for storing the primitive list;
      identifying graphics primitives to be included in the primitive list;
      writing graphics primitives to be included in the primitive list to the first block of memory space; and when there is insufficient space in the first block of memory space to write all of the graphics primitives to be included in the primitive list to the first block of memory space:
allocating a next block of memory space to be used for storing the primitive list;
writing an indication of the location in memory of the allocated next block of memory space at the beginning of the first block of memory space; and
writing further graphics primitives for the primitive list to the allocated next block of memory space;
the method further comprising, for a final block of memory space allocated to be used for storing a primitive list, writing an indication of the location in memory of the end of the primitive list at the beginning of that final block of memory space allocated for storing the primitive list, instead of writing an indication of the location in memory of an allocated next block of memory space at the beginning of the block of memory space.

2. The method of claim 1, wherein the first block of memory space that is allocated to a primitive list is smaller than any subsequent blocks of memory space that are allocated for storing the primitive list.

3. The method of claim 1, comprising:
when a block of memory space is the final block of memory space for a primitive list, storing information indicative that no further blocks of memory space have been used to store the primitive list at the beginning of that final block of memory space instead of an indication of a next block of memory space for the primitive list.

4. The method of claim 1, wherein:
allocating a block of memory space for storing a primitive list comprises writing a dummy value at the beginning of the block of memory space;
and writing an indication of the location in memory of an allocated next block of memory space at the beginning of the block of memory space comprises replacing the dummy value with the indication of the location in memory of the allocated next block of memory space.

5. The method of claim 1, further comprising:
reading the primitive list to identify graphics primitives to process for a tile of the graphics processing output to be rendered.

6. The method of claim 5, comprising:
when reading the primitive list, tracking a current read position in the primitive list and using the tracked current read position for the primitive list to determine when the end of the current memory space block storing the primitive list, and/or the end of the primitive list, has been reached.

7. The method of claim 5, comprising:
when fetching the first block of memory space to be read for the primitive list, initially fetching only a first portion of that block of memory space including at least the portion of the memory space block that would store the memory location reference to a next allocated block of memory space for the primitive list, and determining whether any more of the first block of memory space should be fetched for the primitive list based on the content of the fetched first portion of the block of memory space.

8. The method of claim 5, comprising:
when fetching a block of memory space for the primitive list that is not the first block of memory space for the primitive list, fetching all of that block of memory space, without initially fetching only a portion of the block of memory space.

9. The method of claim 5, comprising:
when reading a block of memory space storing the primitive list:
reading the indication of a location in memory from the beginning of the block of memory space;
determining whether the indication of a location in memory read from the beginning of the block of memory space indicates a location in memory of an allocated next block of memory space used for storing the primitive list; and
when the indication of a location in memory read from the beginning of the block of memory space indicates a location in memory of an allocated next block of memory space used for storing the primitive list, using the read indication of the location in memory of the allocated next block of memory space to begin fetching some or all of the allocated next block of memory space used for storing the primitive list before the reading of the block of memory space from which the indication of the location in memory of the allocated next block of memory space was read has been finished.

10. A method of reading primitive lists in a tile-based graphics processing pipeline in which a graphics processing output to be generated is divided into a plurality of tiles for rendering purposes, with each tile of the graphics processing output being rendered separately, in which one or more primitive lists indicating graphics primitives to be processed for respective regions of the graphics output are stored in one or more blocks of memory space, with each block of memory space used for a primitive list storing at its beginning an indication of a location in memory, the method comprising:
reading a primitive list to identify graphics primitives to process for a tile of the graphics processing output to be rendered; and
when reading a block of memory space storing the primitive list:
reading the indication of a location in memory from the beginning of the block of memory space;
determining whether the indication of a location in memory read from the beginning of the block of memory space indicates a location in memory of an allocated next block of memory space used for storing the primitive list; and
when the indication of a location in memory read from the beginning of the block of memory space indicates a location in memory of an allocated next block of memory space used for storing the primitive list, using the read indication of the location in memory of the allocated next block of memory space to begin fetching some or all of the allocated next block of memory space used for storing the primitive list before the reading of the block of memory space from which the indication of the location in memory of the allocated next block of memory space was read has been finished;
the method further comprising, when reading the primitive list, tracking a current read position in the primitive list and using the tracked current read position for the primitive list to determine when the end of the current memory space block storing the primitive list, and/or the end of the primitive list, has been reached.

11. A graphics processing system comprising a graphics processor configured to perform tile-based graphics processing in which a graphics processing output to be generated is divided into a plurality of tiles for rendering purposes, with each tile of the graphics processing output being rendered separately, the graphics processing system comprising:
- a primitive list preparation circuit configured to prepare and store in memory, a primitive list comprising graphics primitives to be processed for each of one or more regions of a graphics processing output to be generated; and
- a memory block allocation circuit configured to allocate blocks of memory space for storing primitive lists;
- wherein the primitive list preparation circuit and memory block allocation circuit are configured to, when primitive lists are being prepared and stored in the memory:
  - allocate a first block of memory space in the memory for storing a primitive list;
  - identify graphics primitives to be included in the primitive list;
  - write graphics primitives to be included in the primitive list to the first block of memory space; and
  - when there is insufficient space in the first block of memory space to write all of the graphics primitives to be included in the primitive list to the first block of memory space:
    - allocate a next block of memory space to be used for storing the primitive list in memory; and
    - write an indication of the location in memory of the allocated next block of memory space at the beginning of the first block of memory space; and
    - write further graphics primitives for the primitive list to the allocated next block of memory space;
  - wherein the primitive list preparation circuit is configured to:
  - for a final block of memory space allocated to be used for storing a primitive list, write an indication of the location in memory of the end of the primitive list at the beginning of that final block of memory space allocated for storing the primitive list, instead of writing an indication of the location in memory of an allocated next block of memory space at the beginning of the block of memory space.

12. The graphics processing system of claim 11, wherein the first block of memory space that is allocated to a primitive list is smaller than any subsequent blocks of memory space that are allocated for storing the primitive list.

13. The graphics processing system of claim 11, wherein the primitive list preparation circuit is configured to:
- when a block of memory space is the final block of memory space for a primitive list, store information indicative that no further blocks of memory space have been used to store the primitive list at the beginning of that final block of memory space instead of an indication of a next block of memory space for the primitive list.

14. The graphics processing system of claim 11, wherein the primitive list preparation circuit is configured to:
- when a block of memory space is allocated for storing a primitive list, write a dummy value at the beginning of the block of memory space;
- and write an indication of the location in memory of an allocated next block of memory space at the beginning of the block of memory space by replacing the dummy value with the indication of the location in memory of the allocated next block of memory space.

15. The graphics processing system of claim 11, wherein the graphics processor further comprises a primitive list reading circuit configured to read a primitive list to identify graphics primitives to process for a tile of a graphics processing output to be rendered.

16. The graphics processing system of claim 15, wherein the primitive list reading circuit is configured to:
- when reading a primitive list, track a current read position in the primitive list and using the tracked current read position for the primitive list to determine when the end of the current memory space block storing the primitive list, and/or the end of the primitive list, has been reached.

17. The graphics processing system of claim 15, wherein the primitive list reading circuit is configured to:
- when fetching the first block of memory space to be read for a primitive list, initially fetch only a first portion of that block of memory space including at least the portion of the memory space block that would store the memory location reference to a next allocated block of memory space for the primitive list, and determine whether any more of the first block of memory space should be fetched for the primitive list based on the content of the fetched first portion of the block of memory space.

18. A non-transitory computer readable storage medium storing computer program comprising computer software code which when executing on at least one processor, performs a method of preparing and storing primitive lists for use in a tile-based graphics processing system in which a graphics processing output to be generated is divided into a plurality of tiles for rendering purposes, with each tile of the graphics processing output being rendered separately, the method comprising:
- preparing and storing a primitive list indicating graphics primitives to be processed for each of one or more regions of the graphics processing output;
- wherein preparing and storing a primitive list comprises:
  - allocating a first block of memory space for storing the primitive list;
  - identifying graphics primitives to be included in the primitive list;
  - writing graphics primitives to be included in the primitive list to the first block of memory space; and
  - when there is insufficient space in the first block of memory space to write all of the graphics primitives to be included in the primitive list to the first block of memory space:
    - allocating a next block of memory space to be used for storing the primitive list;
    - writing an indication of the location in memory of the allocated next block of memory space at the beginning of the first block of memory space; and
    - writing further graphics primitives for the primitive list to the allocated next block of memory space;
- the method further comprising, for a final block of memory space allocated to be used for storing a primitive list, writing an indication of the location in memory of the end of the primitive list at the beginning of that final block of memory space allocated for storing the primitive list, instead of writing an indication of the location in memory of an allocated next block of memory space at the beginning of the block of memory space.

* * * * *